United States Patent [19]

Parker

[11] Patent Number: 5,182,344

[45] Date of Patent: Jan. 26, 1993

[54] CURING POLYESTER OR POLYCARBONATE AND POLYEPOXIDE WITH POLYORGANO PHOSPHOROUS CATALYST

[75] Inventor: Theodore L. Parker, Walnut Creek, Calif.

[73] Assignee: The Dow Chemical Company, Midland, Mich.

[21] Appl. No.: 690,147

[22] Filed: Apr. 23, 1991

Related U.S. Application Data

[62] Division of Ser. No. 405,992, Sep. 11, 1989, Pat. No. 5,037,903.

[51] Int. Cl.$^5$ .................. C08L 63/02; C08L 63/04; C08L 67/02; C08L 69/00
[52] U.S. Cl. .................................. 525/438; 525/463
[58] Field of Search ........................ 525/438, 463

[56] References Cited

U.S. PATENT DOCUMENTS

| | | |
|---|---|---|
| 3,098,056 | 7/1963 | Schnell . |
| 3,261,808 | 7/1966 | Schnell . |
| 3,969,475 | 7/1976 | Horiuchi et al. ............. 264/310 |
| 4,197,390 | 4/1980 | Jackson ......................... 525/404 |
| 4,302,574 | 11/1981 | Doorakian et al. ............ 528/89 |
| 4,340,761 | 7/1982 | Doorakian et al. ............ 568/11 |
| 4,348,500 | 9/1982 | Robeson et al. .............. 525/65 |
| 4,354,015 | 10/1982 | Doorakian et al. ........... 525/507 |
| 4,456,732 | 6/1984 | Nambu et al. ................ 525/65 |
| 4,556,681 | 12/1985 | Liberti et al. ................. 524/109 |
| 4,579,982 | 4/1986 | Briggs et al. ................. 568/857 |
| 4,602,070 | 7/1986 | Cavitt et al. .................. 525/528 |
| 4,719,268 | 1/1988 | Hefner, Jr. et al. ........... 525/454 |
| 4,746,725 | 5/1988 | Evans et al. .................. 528/370 |
| 4,749,728 | 6/1988 | Craun et al. .................. 525/340 |
| 4,766,184 | 8/1988 | Hefner, Jr. ................... 525/463 |
| 4,782,124 | 11/1988 | Hefner, Jr. et al. ............ 525/463 |
| 4,788,251 | 11/1988 | Brown et al. .................. 525/67 |
| 4,906,693 | 3/1990 | Craun et al. .................. 525/444 |

FOREIGN PATENT DOCUMENTS

| | | |
|---|---|---|
| 0138389 | 4/1985 | European Pat. Off. . |
| 3332396 | 3/1985 | Fed. Rep. of Germany ...... 525/438 |

OTHER PUBLICATIONS

Wagner and Zook, *Synthetic Organic Chemistry*, John Wiley and Sons, Inc., New York, N.Y., 1953, pp. 479 and 484.

Funahashi, "New Ring Opening Reactions of Oxiranes with Aryl Carboxylates," *Chemical Society of Japan bulletin*, vol. 52, No. 5, 1979, pp. 1488.

Interaction of Polyesters With Epoxy Polymers: Insertion of Oxirane Rings Into Ester Bonds. Komarova et al., *Journal of Polymer Science*, Polymer Chemistry Edition, vol. 16, 1643-1657 (1978), John Wiley & Sons, Inc.

Chemistry of Epoxide-Polycarbonate Copolymer Networks, Yu and Bell, Polymer Program U-136, Inst. of Material Science, Univ. Of Connecticut, *Journal of Polymer Science: Part A: Polymer Chem.*, vol. 26, 247-254 (1988), John Wiley & Sons Inc.

*Primary Examiner*—Robert E. Sellers
*Attorney, Agent, or Firm*—Robert R. Stringham; Janet Pauline Clark

[57] ABSTRACT

Thermoformable, thermosettable resins essentially free of secondary alcohol groups are obtained by reaction of oxiranes in active hydrogen-free polyepoxide with carboxylate and/or carbonate groups in active hydrogen-free aryl polyesters, polycarbonates or copolyestercarbonates in the presence of catalytically effective amounts of certain polyorgano phosphonium or phosphine iminium salts.

38 Claims, No Drawings

CURING POLYESTER OR POLYCARBONATE AND POLYEPOXIDE WITH POLYORGANO PHOSPHOROUS CATALYST

CROSS REFERENCE TO RELATED APPLICATIONS

This application is a divisional of U.S. patent application Ser. No. 07/405,992, filed Sep. 11, 1989 now U.S. Pat. No. 5,037,903.

All but two of the phosphonium compounds and all of the phosphine aminium compounds disclosed herein to be catalysts for oxirane/carboxylate or oxirane/carbonate reactions are claimed as new compounds in two pending U.S. patent application Ser. Nos. 07/358,319 and 07/358,297 respectively entitled "NOVEL PHOSPHONIUM SALTS" and "NOVEL BIS (PHOSPHORANYLIDENE) AMMONIUM SALTS", both filed on May 25, 1989 in the name of Theodore L. Parker as the inventor.

BACKGROUND OF THE INVENTION

Typical reaction products of epoxy resins with crosslinking curing agents include secondary alcoholic hydroxyl groups which were present as such in the starting epoxies or have been produced by ring opening reactions of oxirane groups with hydroxyls (or other active hydrogen source groups). The alcoholic hydroxyls in the cured epoxies attract and provide binding sites for environmental water. The water acts as a plasticizer and thereby lowers the tensile and flexural strengths and the modulus of the cured resin. It also increases the dielectric constant of the resin.

It might be expected that formation of hydroxyls would be avoidable by using anhydrides to cure epoxies. In fact, however, because active hydrogen compounds must be used with anhydrides as promoters and because it has been found empirically necessary to use less than stoichiometric amounts of anhydrides, the presence of hydroxyls (alcoholic and/or carboxylic) in the cured epoxies is not so avoided.

Accordingly, other epoxy curing reactions which might not result in hydroxyl group formation were sought. A candidate such reaction would appear to be oxirane/ester or oxirane/carbonate reaction.

In 1974, it was reported (L.I. Komarova et al., *Vysokomol. Soedin.*, B16, 718, 1974) that the ready reaction of any of several different types of diepoxides with a variety of polyesters resulted in curing (hardening).

In 1978, it was further reported** that the previously noted curing was due to reaction of ester groups with oxirane rings. Utilization of epoxy oligomers as hardeners for polyesters was suggested. The following typereaction—which does not produce hydroxyls—was disclosed.

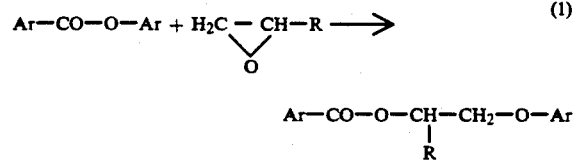

(1)

**Komarova et al., Journal of. Polymer Science, Polymer Chem. Ed., Vol 16, pp. 1643-1657 (1978): John Wiley & Sons, Inc.

Also reported ***—in 1979—were base-catalyzed adductions of aryl esters (phenyl acetate, phenyl benzoate, S-phenyl thiobenzoate) and diphenyl carbonate with monofunctional epoxides (ethylene and propylene oxide, styrene oxide and phenyl glycidyl ether).

***K. Funahashi, *Bulletin of the Chem. Soc. of Japan*, Vol. 52(5), pp. 1488-1492 (1979)

A recent paper **** discloses the formation of an "Epoxide-Polycarbonate Copolymer Network" when a phenol-terminated bis-phenol A-type polycarbonate oligomer is reacted with a stoichiometric amount of an oligomeric digycidyl ether of bisphenol A advancement product with bisphenol A. The network has the structure of a "phenoxy resin" cross-linked through carbonate groups. The reaction is catalyzed by quaternary ammonium salts, tertiary amines and alkoxides (the latter two types of compounds also catalyzing homopolymerization of epoxides). The density of cross-linking in the network can be controlled by adjusting the number ratio of carbonate to oxirane groups, each carbonate being able to react out two oxiranes. The copolymer product is depicted (in a partial structure) as containing secondary alcoholic hydroxyls—presumably present in the oligomeric epoxide used.

****Yu and Bell, *Journal of Polymer Science: Part A. Polymer Chem. Vol.* 266, pp. 247-254 (1988) John Wiley & Sons.

According to U.S. Pat. No. 4,782,124 (1988), it is possible to modify epoxides which contain alcoholic hydroxyls by reacting the hydroxyls with aromatic carbonates, using a transesterification catalyst (such as, for example, ethyl triphenylphosphonium acetate—as such or as "A-1", the complex with a molecule of acetic acid—ethyltriphenyl phosphonium phosphate or tetrabutyl phosphonium phosphate).

Thus, although the prior art does not itself suggest doing so, it would appear that even epoxides containing active hydrogen-containing groups could be converted (as by transesterification) to hydroxyl-free epoxides suitable for preparation of hydroxyl-free copolymers of the type disclosed by Yu and Bell.

However, the prior art known of by the present inventor does not provide much guidance as to whether or not ester or carbonate cured epoxies would have physical properties making them suitable for one or more commercial applications. It is known that blends of epoxides and carbonates are substantially tougher than the epoxides alone and the Yu and Bell paper shows Tg's (glass transition temperatures) of up to 123° C. for copolymer networks (of the disclosed type) at several reactant values. (The highest Tg given for the "linear phenoxy" resins per se—when self-converted by heating, is about 60° C.) However, no indication as to melt processability of the copolymers or of other cured product properties is provided.

OBJECTS OF THE INVENTION

The primary object of the present invention is to provide an epoxide composition which
1. is thermosettable but can be melt processed as a partially cured product,
2. is essentially free of secondary alcoholic hydroxyl groups, and
3. is useful for preparing thermoformed articles and as the matrix material for polymeric composites.

A further object is to provide a novel and facile method of preparing such a composition.

Still other objects will be made apparent to those knowledgeable in the art by the following specifications and claims.

SUMMARY OF THE INVENTION

Definitions of terms employed in the following summary (and thereafter in this patent) are provided below.

It has been found that the foregoing objects can be attained by reacting ester groups in active hydrogen-free aryl polyesters with oxirane groups in active hydrogen-free polyepoxides, in the presence of polyorgano pentavalent phosphorous salts meeting certain specifications.

The invention is more precisely summarized as follows.

The composition of the invention is:

A melt-processable and latently thermosettable composition comprising (a) an aromatic polyester essentially free of active hydrogens, (b) a compatible polyepoxide essentially free of active hydrogens, and (c) a catalytically effective amount of a catalyst for the reaction of ester groups in said polyester with oxiranes in said polyepoxide;

the number ratio of said oxiranes to said ester groups being within the range of from about 0.8/1 to about 2.25/1, and said catalyst being a polyorgano, pentavalent phosphorous compound which, when (1) said polyester is a polycarbonate prepared from bisphenol A and phosgene and has a weight average molecular weight of about 24,000, (2) said polyepoxide is the diglycidylether of bisphenol A, (3) the polycarbonate to polyepoxide ratio by weight is 42.5/57.5 and the amount of said catalyst is 0.015 mmoles per gram of the total weight of the polycarbonate and polyepoxide, and (4) the polycarbonate, polyepoxide and catalyst are mixed together and the Secant Onset Temperature of the resultant mixture determined, results in said Temperature being within the range extending from above 125° C. to the highest temperature at which said composition can be melt-processed without deteriorating or prematurely setting up.

The polyepoxide preferably comprises, per molecule, an average of at least two oxirane groups contained in glycidyl, glycidyloxy or glycidyl oxycarbonyl groups attached directly to one or more aromatic rings, preferably benzene rings.

The method of the invention is:

The method of making a latently thermosettable, thermoplastic resin mass which includes the following steps:

A. selecting a composition which comprises (a) an aromatic polyester essentially free of active hydrogens, (b) a compatible polyepoxide essentially free of active hydrogens, and (c) a catalytically effective amount of a catalyst for the reaction of ester groups in said polyester with oxiranes in said polyepoxide the number ratio of said oxiranes to said ester groups being within the range of from about 0.8/1 to about 2.25/1, and said catalyst being a polyorgano, pentavalent phosphorous salt which when (1) said catalyst being a polycarbonate prepared from bisphenol A and phosgene and has a weight average molecular weight of about 24,000, (2) said polyepoxide is the diglycidylether of bisphenol A, (3) the polycarbonate, polyepoxide and ratio by weight is 42.5/57.5 and the amount of said catalyst is 0.015 mmoles per gram of the total weight of polycarbonate and polyepoxide, and (4) the polycarbonate, polyepoxide and catalyst are mixed together and the Secant Onset Temperature of the resultant mixture determined, results in said Temperature being within the range extending from above 125° C. to the highest temperature at which said composition can be melt-processed without deteriorating or prematurely setting up, and B. converting a body of said composition by melt-processing it at or above a first temperature to a shaped mass which is partially cured to an extent such that if it is cooled as necessary until it solidifies and then reheated, it can be further melt-processed at a temperature higher than said first temperature.

DEFINITION OF TERMS USED

1. Melt-blendable. Forms a solution or a homogeneous dispersion when melted and stirred.
2. Thermoplastic Thermosettable. Conventional meanings.
3. Aromatic Polyester. A polymer chain in which the repeating units comprise —R—O—CO and/or —R—O—CO—O groups in which the R's are divalent aryl radicals. "Esters" includes carbonates. By "poly" is meant an average of at least two units per molecule.
4. Epoxide, Epoxy or Polyepoxide. An at least difunctional oxirane compound or a mixture of compounds having an average oxirane functionality of about 1.5 or more.
5. Active Hydrogens. Hydrogens reactive with oxirane or carbonate groups; present in functional groups such as hydroxyl, carboxyl, amino, and amido, for example.
6. Catalyst. As a matter of convenience, this term is used even though the compounds may function —strictly speaking—as "initiators" or "catalysts" in various oxirane/ester or oxirane/carbonate reaction mixtures.
7. Secant Onset Temperature. The value on the temperature axis corresponding to the intersection of a straight line (drawn as a secant to the total heat flow versus temperature curve plotted by a duPont 1090 Differential Scanning Calorimeter) and the interpolated base line of the exothermic peak signal.
8. Melt-processed. Caused to assume a particular shape and/or undergo a change in rheology: often in concurrence with changes in molecular structures, including development of cross-links, as a consequence of induced chemical reactions in the melt.
9. Deterioration. Undergoing, to an intolerable extent, property changes detrimental to the use contemplated for the final product.
10. Essentially Free Of. Including not more than incidental amounts of.

Note: This does not exclude using epoxides having more than incidental amounts of active hydrogen functions, so long as said functions are first converted to inactive or non-interfering derivative groups (in situ, in some cases) and/or the amount of carbonate charged is still sufficient to convert the desired proportion of oxiranes.

11. Inactive Or Non-Interfering. Not detrimentally effecting the rate of one or more desired reactions or the nature of the products of the same, to an intolerable extent.
12. Compatible. Miscible without requiring the presence of a solvent. That is, if a mixture of the epoxide, and the ester is melted, or if a hot solution of the epoxide and ester in a solvent is stripped to a final temperature at which the residual mixture is molten, the resulting melt is a homogeneous dispersion or solution.
13. Phosphine Iminium Compounds. (exemplified by Formula 15 herein) are also known as bis (phosphoranylidene) ammonium salts.
14. Aromatic. Includes heteroaromatic.

DETAILED DESCRIPTION

Suitable Epoxides

Epoxides suitable for the practice of the present invention are polyepoxides in general. Such polyepoxides may be single molecular species containing two or more oxirane groups per molecule or may be species mixtures having an average of about 1.5 or more oxiranes per molecule. This of course is with the stipulation that the polyepoxide employed must be essentially free of active hydrogens. Any or all of the oxirane-functional species constituting an epoxy resin employed may include such non-interfering or inert substituents as it is synthetically feasible to incorporate in those species (without unduly increasing the average EEW of the epoxide).

Epoxides which include substantial contents of active hydrogen-containing functional groups are not, per se, suitable but may be made suitable by converting those groups to ester groups or to unreactive or non-interfering derivative groups. Thus, for example, secondary alcoholic hydroxyls may be transesterfied by conventional procedures at moderate temperatures with monoaryl carbonates of lower alcohols, the latter being readily stripped off as they are produced in the reaction. Alternatively, the active hydrogen-containing groups may be reacted with an aromatic chloroformate, such as—for example—phenyl chloroformate. Either of the latter expedients may be used to convert the active hydrogen source groups to aromatic carbonate groups—which can participate in the subsequent formation of cross-links by (catalyzed) oxirane/carbonate interaction.

When the epoxide is of such high molecular weight that is not—as such—compatible with the ester component, it may be possible to render it so, if it includes a substantial number of active hydrogen functions, by converting the latter to —CO—OR or —O—CO—OR groups.

Exemplary types of suitable epoxides are diolefin diepoxides, vinylcycloalkene dioxides, dicyclodiolefin dioxides, divinylbenzene dioxide, diallylbenzene dioxide, the dioxide of biscyclopentenyl ether: the dioxide of p,p'-divinyldiphenyl, the dioxides of divinyl diphenylsulfide and -oxide: diglycidyl ether, the diglycidyl ethers of dihydroxy benzenes and dinuclear diphenols ("bisphenols", most notably) and the diglycidyl esters of diacids.

Other representative epoxides are hydantoin epoxides, such as, for example, N,N'-diglycidyl hydantoins, 1-glycidyl-3-(2,3-diglycidyloxy-prop-1-yl)5,5-dimethylhydantoin and 1,3-di-(1-glycidyl-5,5-dimethylhydantoin-1-yl)-2-glycidyloxypropane. Dihydrouracils, barbituric acids, cyanuric and isocyanuric acids comprising 2 or 3 glycidyl groups are also suitable.

More exotic types of diepoxides, such as those containing silicon, phosphorous or other hetero atoms in linear, branched or cyclic segments of the molecule may also be suitable as the predominant component of an epoxy resin, either as the sole diepoxide employed in the oxirane/ester reaction or in admixture with other epoxides.

The epoxides of the following Formulas 1–5 are generally preferred for the practice of the present invention (the hydroxyl groups in epoxides of Formulas 1, 2, 4 and 5 of course being present only in such amounts as correspond to n, n'', n''' and n'''' values within the range of zero to about 0.2 respectively, or being first converted to inert or not detrimentally reactive derivative groups).

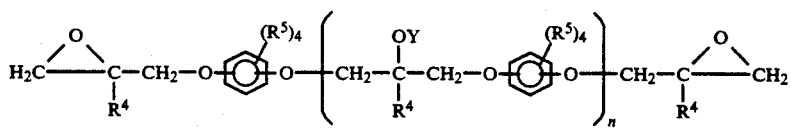

Formula 1

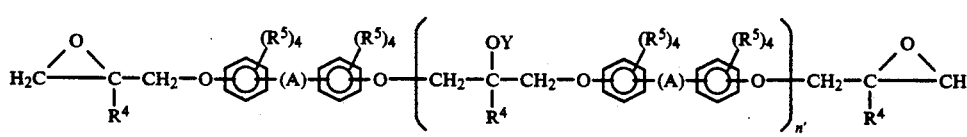

Formula 2

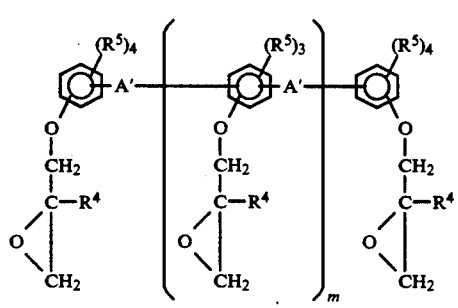

Formula 3

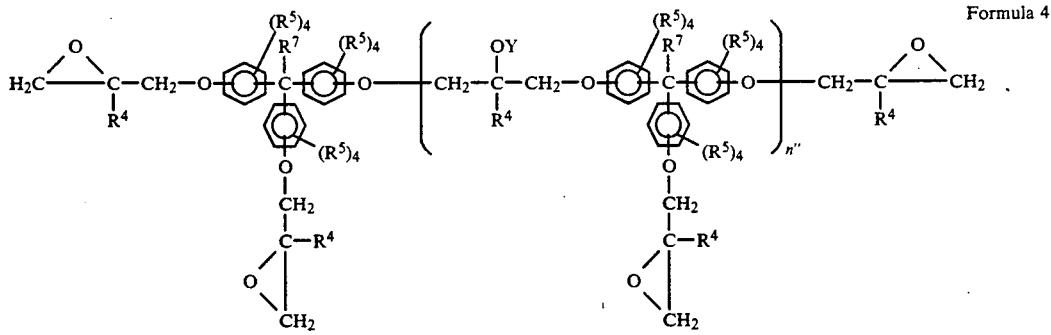

Formula 4

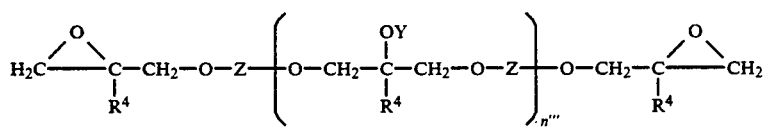

Formula 5 wherein A is a direct bond, a hydrocarbylene group having from 1 to about 12, preferably from 1 to about 6 carbon atoms,

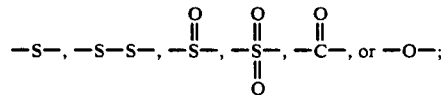

Z is hydrocarbylene group containing from 1 to about 15 carbon atoms or a $-C(R^6)_2-C(R^6)_2-[O-C(R^6)_2-C(R^6)_2]_{m'}$ group: A' is a divalent hydrocarbylene group having from 1 to about 3, preferably 1, carbon atoms or a polycyclopentadienylidenyl radical—i.e.,

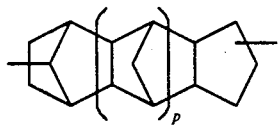

in which p has a value of from zero to about 10: in the forgoing Formulas 1–5, each $R^4$, independently, is H or $CH_3$ each $R^5$, independently, is H a $C_1$–$C_4$ alkyl, alkenyl or alkoxy group, bromo or chloro. Each $R^6$ is independently H or a $C_1$–$C_4$ hydrocarbyl radical; $R^7$ is H or a $C_1$–$C_{10}$ alkyl or alkenyl radical: m has a value of from about 0.001 to about 6; m' has a value of from about 1 to about 100: n has a value of from zero to about 60, preferably zero to about 20: n' has a value of from zero to about 40, preferably zero to about 0.2; n" has a value of from zero to about 5, preferably zero to about 3: n''' has a value of from zero to about 40, preferably zero to about 0.2; and Y is H, $R^8$, $-CO-R^8$ or $-CO-O-R^8$, $R^8$ being a $C_1$–$C_{15}$ hydrocarbyl radical, preferably a phenyl radical, with the restriction that the average number of Y's per molecule of said polyepoxide which are H is about 0.2 or less.

Exemplary of nominally difunctional epoxides of Formula 1 which actually have average oxirane functionalities of somewhat less than 2, but which are eminently suitable are liquid epoxides in which—in each occurrence—each of $R^4$ and $R^5$ are H and n is within the range of from 0 to about 0.15.

Alcoholic hydroxyl groups in the epoxide may be converted to carbonate groups by transesterification in a conventional manner. U.S. Pat. No. 4,782,124 discloses suitable transesterification catalysts and is incorporated herein by reference for all purposes which may legally be served thereby.

Particularly preferred are the following specific epoxides sold by Dow Chemical Co. (See notes at bottom of Table 1 (Example 2) herein): DER*-383, DER*-332, TACTIX*-742, DEN*-438, XD-71756.00 and XD-71756.01.

*Trademark of The Dow Chemical Company.

Suitable "Polyesters"

The aromatic polyesters suitable for the practice of the present invention are simple polyesters, polyetheresters, polyestercarbonates and polycarbonates (in this sentence, the meaning of "ester" is limited to carboxylate groups).

Non-aromatic hydrocarbyl or hetrohydrocarbyl moieties may be included in or dependent from the polymer chains in any of the several preceding kinds of aromatic "polyesters" but at least one $-CO-O-$ or "½" of a $-O-CO-O-$ group per oxirane to be reacted out must be provided by the polyester in the form of $R-O-CO$ and/or $R-O-CO-O$ groups in which the R's are aryl or arylene radicals.

Preferably, all of the "ester" groups are in the form of $R-O-CO-R$ and $R-O-CO-O-R$ groups in which the R's are aryl or arylene radicals. The carbonate and/or carboxylate is most preferably a bisphenol A polycarbonate or a polyestercarbonate prepared from bisphenol A, phosgene, terephthaloyl and isophthaloyl chlorides, the carboxylate to carbonate ratio being within the range of 2–4. and the tere- to isophthaloyl ratio ranging from about 2 to about 4.

Among simple polyesters (polycarboxylates), the fully aromatic species, such as the "polyarylates" derived from dihydric phenols and aromatic dicarboxylic acids, for example, are most preferred.

Suitable dihydric phenols for the preparation of any of the foregoing types of polyesters include those of the following Formulas 6 and 7:

$$\text{HO}-\underset{(R^5)_4}{\underset{|}{\bigcirc}}-\text{OH} \qquad (6)$$

$$\text{HO}-\underset{(R^5)_4}{\underset{|}{\bigcirc}}-A-\underset{(R^5)_4}{\underset{|}{\bigcirc}}-\text{OH} \qquad (7)$$

wherein each $R^5$ independently is H or a non-interfering substituent (such as halo, cyano, nitro or a hydrocarbyl group of up to 4 carbons, for example) and A is a direct bond, a hydrocarbylene group of 1 to about 12, preferably 1 to about 6 carbons, more preferably isopropylidene, $$-S-, -S-S-, -\underset{O}{\overset{O}{\underset{\|}{S}}}-, -\underset{O}{\overset{O}{\underset{\|}{S}}}-, -\overset{O}{\underset{\|}{C}}-, -O- \text{ or } -\underset{CF_3}{\overset{CF_3}{\underset{|}{C}}}-.$$

Suitable aromatic dicarboxylic acids for the preparation of the polyester include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Preferably, mixtures of isophthalic acid and terephthalic acid are used. The isophthalic acid to terephthalic acid ratio in the mixture is about 20:80 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polyester preparation.

The polyarylates can be prepared by any of the well know prior art polyester forming reactions, such as the reaction of the acid chlorides of the aromatic dicarboxylic acids with the dihydric phenols: the reaction of the diaryl esters of the aromatic dicarboxylic acids with the dihydric phenols: or the reaction of the aromatic diacids with diester derivatives of the dihydric phenol. These processes are described in, for example, U.S. Pat. Nos. 3,317,464: 3,948,856; 3,780,148: 3,824,213 and 3,133,898.

Also contemplated herein, although believed less suitable, are the above polyesters with minor amounts, e.g., from 0.5 to about 2 percent by weight, of units derived from aliphatic acids and/or aliphatic polyols, to form copolyesters. The aliphatic polyols include glycols, such as poly(ethylene glycol). These can be made following the teachings of, for example, U.S. Pat. Nos. 2,465,319 and 3,047,539.

Examples of suitable aromatic dicarboxylic acids are isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present, such as in 1,4- or 1,5-naphthalenedicarboxylic acids. The preferred dicarboxylic acids are terephthalic acid or a mixture of terephthalic and isophthalic acids.

The polyesters described herein are either commercially available or can be produced by methods well known in the art.

Representative aromatic dicarboxylic acids which may be used are phthalic, terephthalic and isophthalic acids, substituted dicarboxy compounds with two benzene nuclei, such as bis(p-carboxyphenyl)methane and p-carboxyphenyl/oxybenzoic acid. Among the aromatic acids, those with from 8 to 16 carbon atoms are preferred, particularly the phenylene dicarboxylic acids, i.e., terephthalic and isophthalic acids.

Preferably, at least about 70 mole percent of the dicarboxylic acid incorporated into the polyester is terephthalic acid and at least about 70 mole percent of the aromatic diol incorporated into the polyester is bisphenol A.

The aromatic polycarbonates that can be employed herein are homopolymers and copolymers and mixtures thereof. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)-propane, 4,4-bis(4-hydroxyphenyl)heptane, 2-2-(3,5,3',5'-tetrabromo-4,4'-dihydroxydiphenyl)propane, (3,3'-dichloro-4,4'-dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of dihydric phenol with a glycol or with hydroxy or acid terminated polyesters, or with a dibasic acid in the event a carbonate copolymer or inter-polymer is desired for use as the aromatic carbonate polymer.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed as such precursors are diphenyl carbonate, di-(halophenyl)carbonates, such as di-(chlorophenyl)carbonate, or di-(bromophenyl)carbonate, etc., di-(alkylphenyl)-carbonates such as di(tolyl)carbonate, di(naphthyl)carbonate, di(-chloronaphthyl)carbonate, etc. or mixtures thereof. The haloformates suitable for use herein include bishaloformates of dihydric phenols; for example, bischloroformates of bisphenol-A, or of hydroquinone, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide a carbonate, a bicarbonate, or a phosphate of an alkali or alkaline earth metal.

The catalysts which are employed can be any of the suitable catalysts that aid the polymerization of, for example, bisphenol-A with phosgene. Suitable catalysts include tertiary amines, such as triethylamine, tripropylamine, N,N-dimethlaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or two-phase (interfacial) systems when phosgene or a haloformate are used. Bulk reactions are possible when the diarylcarbonate precursors are used.

Also, aromatic polyester carbonates may be used. These are described in, for example, U.S. Pat. No. 3,169,121. A preferred polyester carbonate results from the condensation of phosgene, terephthaloyl chloride, isophthaloyl chloride with bisphenol A and a small amount of p-tertbutylphenol.

The suitable polycarbonates are prepared under conditions conducive to formation of chains terminated by carbonate groups (—O—CO—OR in which R is an aryl group—unsubstituted or including one or more non-interfering substituents) by well known methods. See *Encyclopedia of Polymer Science and Technology*. Vol. 10, pp. 710–764 (1969): John Wiley & Sons, Inc., and Kirk-Othmer, *Encyclopedia of Chemical Technology*, 3rd. Ed., Vol. 18, pp. 479–494 (1982): John Wiley & Sons, Inc.

Included as suitable polycarbonates are copolycarbonates (homo-bonded copolymers) derived from different dihydroxy compounds and copolycarbonates (hetero-bonded copolymers) having in the main chain a carbonate group and another group such as—for example—a siloxane moiety.

The polycarbonate may have a weight average molecular weight within the range from about 226 to about 35,000, but preferably is within the range of from about 350 to about 30,000: more preferably from about 10,000 to about 24,000.

Catalysts

The reaction of oxirane groups with aromatic carbonate and/or ester linkages requires use of a catalyst. With the exception of ethyltriphenyl phosphonium acetate acetic acid complex, compounds known to catalyze other reactions of epoxides and found to be effective for epoxide/ester reaction typically show activity at relatively low temperatures of about 70 to about 125° C. It has been found that in many cases, particularly when the compound containing aromatic carbonate and/or ester linkages is a polymer such as polycarbonate, polyester, or polyestercarbonate, the above mentioned, known catalysts do not provide a sufficient processing window for melt blending the catalyst and the epoxy resin with the compound containing carbonate and/or ester linkages.

What is needed is an active and effective catalyst, for the reaction of oxirane groups in epoxy resins with aromatic carbonate and/or ester groups, whose activity begins at a temperature of about 125° C. or greater. Furthermore, the catalyst activity should be substantially developed below the decomposition temperature of the epoxy/carbonate/ester composition, which generally begins at about 300°–320° C. in air. The catalyst desirably does not initiate or speed up side reactions to such an extent that there does not result a cured product with a better combination of physical properties vis a vis the same epoxy resin per se cured with generally comparable types of catalysts.

Suitable catalysts for the practice of the invention have been found to be polyorgano, pentavalent phosphorous salts which satisfy the catalyst requirements set out in the section of these specifications entitled "Summary of the Invention".

Preferred such catalysts may be represented by the Formula $$[J(Q)_t]\oplus X\ominus \qquad (8)$$

wherein t=zero or 1, preferably 1: when t=zero, J is $R_4P\oplus$ and when t=1, J is $R_3P$ and Q is $=N\oplus=PR_3$. That is, when t=zero, the salt is a tetraorgano-phosphonium compound of the Formula $$R_4P\oplus X\ominus \qquad (9)$$

and when t=1, the salt is a hexaorgano phosphine iminium compound of the Formula $$R_3P=N\oplus=PR_3X\ominus. \qquad (10)$$

In each of Formulas 9 and 10, R, independently in each occurrence, is a $C_{1-20}$ hydrocarbyl group.

In Formula 9, $X\ominus$ is an anion selected from the group consisting of
$R^1SO_3\ominus$, $R^2COO\ominus$, $(R^3SO_2)_2N\ominus$, $R^1SO_2\ominus$, $R^1OHPO_3\ominus$, $(R^1O)_2PO_2\ominus$, and $R^1HPO_3\ominus$,
wherein
$R^1$ is a $C_{1-12}$ hydrocarbyl or halohydrocarbyl radical,
$R^2$ is a hydrogen radical, a $C_1$–$C_{12}$ hydrocarbyl or halohydrocarbyl radical, and
$R^3$ is a $C_{1-12}$ hydrocarbyl radical.

In Formula 10, $X\ominus$ is an anion selected from the group consisting of:
$R^1SO_3\ominus$, $R^2COO\ominus$, $(R^3SO_2)_2N\ominus$, $R^1SO_2\ominus$, $R^1OHPO_3\ominus$, $(R^1O)_2PO_2\ominus$, $R^1HPO_3\ominus$, $H_2PO_4\ominus$, $HCO_3\ominus$, $HSO_4\ominus$, $PF_6\ominus$, and $SbF_6\ominus$,
wherein $R^1$, $R^2$ and $R^3$ are as above defined for Formula 9.

In the phosphonium compounds of Formula 9:
$X\ominus$ is preferably $R^1SO_3\ominus$, $R^2COO\ominus$, or $(R^3SO_2)_2N\ominus$, more preferably $R^1SO_3\ominus$ or $(R^3SO_2)_2N\ominus$.

$R^1$ is preferably an $C_{1-12}$ alkyl, $C_{1-12}$ haloalkyl, $C_{3-12}$ cycloalkyl, $C_{3-12}$ halocycloalkyl, $C_{6-12}$ alkylaryl, $C_{6-12}$ haloalkylaryl, $C_{6-12}$ aryl, or $C_{6-12}$ haloaryl radical: more preferably a $C_{1-6}$ alkyl, $C_{1-6}$ haloalkyl, $C_{6-12}$ alkylaryl, $C_{6-12}$ haloalkylaryl, phenyl, or halophenyl radical. Preferred halohydrocarbyl radicals are chlorohydrocarbyl radicals; more preferably a monovalent $C_{1-6}$ chloroalkyl, $C_{6-12}$ chloroalkylaryl, or chlorophenyl radical.

$R^2$ is preferably a monovalent $C_{1-12}$ alkyl, $C_{1-12}$ haloalkyl, $C_{3-12}$ cycloalkyl, $C_{3-12}$ halocycloalkyl, $C_{6-12}$ alkylaryl, $C_{6-12}$ haloalkylaryl, $C_{6-12}$ aryl, or $C_{6-12}$ haloaryl radical: more preferably a $C_{1-6}$ alkyl, $C_{1-6}$ haloalkyl, $C_{6-12}$ alkylaryl, $C_{6-12}$ haloalkylaryl, phenyl, or halophenyl radical. Preferred classes of halohydrocarbyl radicals are chlorohydrocarbyl radicals: more preferably a $C_{1-6}$ chloroalkyl, $C_{6-12}$ chloroalkylaryl, or chlorophenyl radical.

$R^3$ is preferably a $C_{1-12}$ alkyl, $C_{3-12}$ cycloalkyl, $C_{6-12}$ alkylaryl, or $C_{6-12}$ aryl radical; more preferably a $C_{1-6}$ alkyl, $C_{6-12}$ alkylaryl, or phenyl radical.

As used herein, the terms halohydrocarbyl, haloalkyl, halocyoloalkyl, haloalkylaryl, and haloaryl refer to radicals comprising one to three bromo, chloro or fluoro substituents.

In the phosphine iminium compounds of Formula 10, the R radicals are preferably $C_{1-12}$ alkyl, $C_{3-12}$ cycloalkyl, $C_{6-20}$ alkylaryl, or $C_{6-12}$ aryl radicals: more preferably $C_{1-6}$ alkyl, $C_{6-12}$ alkylaryl, or phenyl radicals: even more preferably $C_{1-4}$ alkyl, $C_{6-8}$ alkylaryl, or phenyl radicals: most preferably ethyl, butyl, or phenyl.

$X\ominus$ is preferably an anion selected from the group consisting of $R^1SO_3\ominus$, $R^2COO\ominus$, $(R^3SO_2)_2N\ominus$, $R^1SO_2\ominus$, $R^1OHPO_3\ominus$, $(R^1O)_2PO_2\ominus$, and $R^1HPO_3\ominus$; more preferably $R^1SO_3\ominus$, $R^2COO\ominus$, and $(R^3SO_2)_2N\ominus$; even more preferably $R^1SO_3\ominus$ and $(R^3SO_2)_2N\ominus$.

$R^1$ is preferably a $C_{1-12}$ alkyl, $C_{1-12}$ haloalkyl, $C_{3-12}$ cycloalkyl, $C_{3-12}$ halocyoloalkyl, $C_{6-12}$ alkylaryl, $C_{6-12}$ haloalkylaryl, $C_{6-12}$ aryl, or $C_{6-12}$ haloaryl radical: more preferably a $C_{1-6}$ alkyl, $C_{1-6}$ haloalkyl, $C_{6-12}$ alkylaryl, $C_{6-12}$ haloalkylaryl, phenyl, or halophenyl radical. Preferred halohydrocarbyl radicals include chlorohydrocarbyl radicals: more preferably a $C_{1-6}$ chloroalkyl, $C_{6-12}$ chloroalkylaryl, or chlorophenyl radical.

$R^2$ is preferably a $C_{1-12}$ alkyl or haloalkyl, $C_{3-12}$ cycloalkyl, $C_{3-12}$ halocycloalkyl, $C_{6-12}$ alkylaryl, $C_{6-12}$ haloalkylaryl, $C_{6-12}$ aryl, or $C_{6-12}$ haloaryl radical: more preferably a $C_{1-6}$ alkyl or haloalkyl, $C_{6-12}$ alkylaryl, $C_{6-12}$ haloalkylaryl, phenyl, or halophenol radical. Preferred halohydrocarbyl radicals include chlorohydrocarbyl radicals; more preferably a $C_{1-6}$ chloroalkyl, $C_{6-12}$ chloroalkylaryl, or chlorophenyl radical.

$R^3$ is preferably a $C_{1-12}$ alkyl, $C_{3-12}$ cycloalkyl, $C_{6-12}$ alkylaryl, or $C_{6-12}$ aryl radical; more preferably a $C_{1-6}$ alkyl, $C_{6-12}$ alkylaryl, or phenyl radical.

Whenever $X\ominus$ in a salt of either of Formulas 9 and 10 is a carboxylate anion, the salt may be in the form of a complex with one or more molecules of the corresponding free acid per molecule of the salt. (Catalyst "A-2"—tetrabutyl phosphonium acetate acetic acid complex—for example.)

Catalyst Preparation Methods

The novel phosphonium salts employed in this invention may be prepared by an in situ method or a hydroxide method.

In the in situ method, a first solution is prepared by dissolving the appropriate tetraorgano-phosphonium halide, preferably chloride ($R_4P\oplus Cl\ominus$) or bromide ($R_4P\oplus Br\ominus$), in an alcohol such as methanol. The appropriate acid of the anion X in an alcohol such as methanol is added to the first solution. A second solution is prepared by dissolving an alkali metal hydroxide, such as sodium or potassium hydroxide, in an alcohol such as methanol. The two solutions are mixed to form a precipitate. Toluene may be added to the mixture. The mixture is filtered and vacuum stripped to yield the tetraorgano-phosphonium salt, $R_4P\oplus X\ominus$, as a crude product.

In the hydroxide method, a first solution is prepared by dissolving an alkali metal hydroxide, such as sodium or potassium hydroxide, in an alcohol such as methanol. A second solution is prepared by dissolving the appropriate tetraorgano-phosphonium halide, preferably chloride ($R_4P\oplus Cl\ominus$) or bromide ($R_4P\oplus Br\ominus$), in an alcohol such as methanol. The second solution is chilled and held at a temperature below about 10° C. while adding the first solution with agitation. A precipitate of the alkali metal halide is removed by filtration, leaving a third solution of appropriate tetraorgano-phosphonium hydroxide, ($R_4P\oplus OH\ominus$). A fourth solution is prepared containing the appropriate acid of the anion X in an alcohol such as methanol. The third and fourth solutions are combined to give a precipitate of the tetraorgano-phosphonium salt, ($R_4P\oplus X\ominus$) which is recovered as a crude product by vacuum stripping.

The novel phosphine iminium salts employed in this invention may be prepared by several methods, including an aqueous anion exchange method, an hydroxide method, and a silver salt method.

In the aqueous anion exchange method, a first solution is formed by dissolving the appropriate phosphine iminium halide, preferably the chloride, $R_6P_2N\oplus Cl\ominus$, or bromide, $R_6P_2N\oplus Br\ominus$, in an alcohol such as methanol. Water is then added to the solution. A second solution is formed by dissolving the appropriate alkali metal X salt, preferably the sodium salt, in water. The two solutions are mixed together, forming a precipitate which is the crude phosphine iminium salt, $R_6P_2N\oplus X\ominus$. The reaction is preferably carried out at ambient temperatures. The precipitate is recovered by filtration, purified by water-washing, and dried.

In the hydroxide method, a first solution is formed by dissolving the appropriate phosphine iminium halide, preferably the chloride, $R^6P_2N\oplus Cl\ominus$, or bromide, $R_6P_2N\oplus Br\ominus$, in an alcohol such as methanol. The solution is chilled, preferably to a temperature below about 10° C. A second solution is formed by dissolving an alkali metal hydroxide, such as sodium or potassium hydroxide, in an alcohol such as methanol. The second solution is added dropwise with agitation to the first solution while maintaining the temperature below about 10° C. The mixture becomes a slurry which is filtered to recover the alkali metal halide precipitate. The remaining third solution contains the phosphine iminium hydroxide. A fourth solution is formed by dissolving the appropriate X acid in an appropriate solvent such as methanol. The fourth solution is then mixed with the solution of the phosphine iminium hydroxide. The resulting mixture is then filtered and vacuum stripped to obtain a solid which is the crude phosphine iminium salt, $R^6P_2N\oplus X\ominus$.

In the silver salt method, the appropriate silver X salt is dissolved in a solvent such as acetone to form a first solution. The appropriate phosphine iminium halide, preferably the chloride, $R_6P_2N\oplus Cl\ominus$, or bromide, $R_6P_2N\oplus Br\ominus$, is dissolved in a solvent such as acetone to form a second solution. The two solutions are mixed and the silver halide precipitate which forms is removed by filtration. The remaining solution is then filtered and vacuum stripped to obtain a solid which is the crude phosphine iminium salt, $R_6P_2N\oplus X\ominus$.

The polyorgano phosphorous salts produced by the foregoing methods are able, even in crude form, to meet the activity requirements for catalysts used in the present invention.

The crude phosphonium salts are generally pure enough as such to yield elemental analyses acceptably close to the theoretical values for purposes of identification.

The crude phosphine iminium compounds generally must first be purified, as by recrystallization, for example. This may be carried out by conventional methods, such as the following, for example, The crude salt is dissolved, with heating, in a minimum of an alcohol, such as—for example—ethanol. A small amount of hot water is added dropwise with stirring until a faint cloudiness is observable. The hot mixture is hot-filtered. The filtrate is allowed to cool slowly to room temperature and then chilled. The resulting crystalline precipitate is cold-filtered, washed with a little of a cold, dilute solution of water in the same alcohol and then dried in vacuo at room temperature overnight. The dry salt is sampled and analyzed with conventional precautions taken to prevent moisture take up.

Catalyst Evaluation Procedure

A sample of the catalyst whose activity is to be characterized is dissolved in an appropriate solvent, preferably methylene chloride or methanol, in an amount to give a solution with a catalyst concentration of 0.157 mmole/g. A stock evaluation solution is prepared by mixing Dow Epoxy Resin DER*-332, 57.5 g: a Bis A/Phosgene-derived, 24000 mol. wt. polycarbonate resin, 42.5 g, and methylene chloride, 400 g. To a 10.0 g aliquot of the stock evaluation solution is added 200 mg. of catalyst solution, which results in a catalyst concentration of 0.0157 mmole/g based on solids content. A glass slide is cleaned with methylene chloride and dried. A few milliliters of the catalyzed test solution is placed on the slide and the solvent allowed to evaporate. Residual solvent is removed from the resultant film by heating at 50° C. for 30 minutes. The sample is scraped off the slide and a 10-30 mg portion placed in an aluminum DSC pan and sealed. Using the DuPont 1090 Thermal Analyzer with a Differential Scanning Calorimetry (DSC) module, the sample is scanned at a rate of 10° C./min. the resultant heat flow versus temperature plot is analyzed using the internal program contained in the instrument microprocessor and the Secant Onset Temperature and heat of reaction reported.
*Trademark of The Dow Chemical Company.

Differential Scanning Calorimetry (DSC) is done using a duPont 1090 Thermal Analyzer. Temperature—which is increased at a rate of 10° C./minute—is plotted on the x-axis and heat flow is plotted on the y-axis. A peak in the curve of x,y points indicates an exothermic transition, in this case a chemical reaction, is taking place, beginning at the temperature where the heat flow deviates from the baseline.

The area under the peak is related to the total heat evolved and thus the heat of reaction. This instrument contains several internal programs that may be selected to analyze and display the raw data. Because there is some uncertainty in determining the exact point where heat flow turns positive, the "secant onset" program is used for more reproducible and accurate comparisons. A secant line is drawn to the initial portion of the exothermic peak and extended to where it intersects the interpolated baseline. This defines the "secant onset temperature," which is the temperature where the reaction is just perceptibly beginning. Using the internal kinetics program, it can be shown that for the system under analysis this secant onset temperature represents the same absolute rate.

The same instrument is also employed for determining the Tg's (glass transition temperatures) of the cured composition of the invention, again by inflection but for an endotherm and using a different program.

How the Composition of the Invention is Prepared and Used

Essentially uncured mixtures of the epoxide, the ester and the catalyst can be prepared in several ways. The catalyst will generally be available as a solution. If the ester and/or epoxide is sufficiently fluid at a moderate temperature, the catalyst solution can be introduced as a spray or as a continuous or discontinuous stream, to a stirred or pump-circulated body of the ester and/or epoxide.

If the ester/oxirane reaction is largely to be postponed until sometime subsequent to completion of mixing, the mixing should be carried out at a temperature well below the Secant Onset Temperature, utilizing a suitable solvent if necessary.

However, it will generally be desirable to induce a limited degree of completion of the oxirane/ester reaction so that the composition will hold whatever shape to facilitate or make possible further processing as a given application for the fully cured product requires. To this end, the mixture or solution is heated to a temperature at which it is stirrable and the oxirane/ester reaction proceeds at a useful rate but not so rapidly that the reaction cannot be quenched by cooling.

A typical partial cure schedule for production of a thermoplastic epoxide/polyester polymer is 1-2 hours at 50° C.

The latter partial curing operation of course can be carried out concurrently with a shaping step, which latter can then be followed by cooling, reshaping (pelletizing, for instance) and storage and/or by further thermal processing—which may include completion of curing by further heating.

Thus, while in the thermoplastic (partially cured) state, the composition may readily be given a desired physical shape by such methods as extrusion, molding (compression, injection or transfer), pultrusion, lamination, coating or fiber drawing. Ultimate structural and environmental resistance properties can then be achieved in the subsequent cross-linking (thermosetting or curing) step.

A representative schedule for thermosetting of a typical thermoplastic epoxide/polyester copolymer is 1 hour at 150° C. followed by 1 hour at 180° C. and 4 hours at 200° C.

Oxirane to "Ester" Ratios

Each epoxide-reactive carboxylate group in the aromatic polyester is capable of reacting with one oxirane group. Thus, if all oxiranes in the epoxide are to be converted by carboxylate groups, the theoretical maximum oxirane to ester ratio will be 1/1. Lower ratios are acceptable, down to the lowest ratio at which the proportion of epoxide in the reaction product is still sufficient to result in improved physical or chemical properties in the partially or fully cured product, as compared to the polyester (or the polyepoxide) per se. (See Example 3 herein.) Overall, the range of about 0.9/1 to about 1.1/1 is preferred.

Each oxirane-reactive carbonate group in the aromatic polyester is presumed capable of reacting out two oxiranes. Accordingly, if all the oxiranes are to be converted by carbonate groups, the theoretical maximum number ratio of oxirane to carbonate groups will be 2:1. However, somewhat higher ratios may be acceptable.

It has been found that, in some instances, the cured epoxy-polyester reaction product has a higher Tg (glass transition temperature) if there is present a small excess of the epoxide in the mixture of reactants —such as, for example, the excess corresponding to an oxirane to carbonate group ratio of 2:0.9, or 2.22/1.

Any minor amount of unconverted oxiranes in a cured product may be eliminated by a post treatment—such as microwave or gamma ray irradiation, for example—which does not result in the presence of hydrophillic groups in the final product.

In the other instances, higher Tg's result when the oxirane to carbonate ratio is somewhat less than 2:1: at 1.8/1 for example.

When the polyester is an aromatic polycarboxylate, similar considerations apply and the oxirane to carboxylate group ratio can range from about 0.8/1 to about 1.1/1.

Accordingly, the oxirane to "ester" group number ratio preferably is within the range of from about 0.8 to about 2.25/1, overall. More preferably, the ratio is within the range of from about 0.9/1 to about 2.1/1.

The calculation of reactant weight ratios from the oxirane to "ester" number ratios is according to well know principles, but it must be kept in mind that one carbonate group is, in effect, two reactive groups for the epoxide/carbonate reaction. The molecular weight of the repeating unit (which contains only one carbonate group) in a typical bisphenol A polycarbonate is 254, but the "reactive equivalent weight" of the polycarbonate is only half of 254, or 127. For a typical epoxide, DER-332 TM (which approximates the pure diglycidyl ether of bisphenol A), the EEW (grams of epoxide which provides one gram molecular weight of oxirane) is 172. So the weight ratio of epoxide to polycarbonate corresponding to a 2:1 number ratio of to carbonate groups is $(2 \times 172) \div 254$ or $172 \div 127 = 57.5/42.5$.

For an aromatic "copolyestercarbonate in which the number ratio of carboxylate to carbonate groups is 3:1, the epoxy reactive equivalent weight as 162.34—based on one oxirane reacting with each carboxylate linkage and two oxiranes reacting with each carbonate group—the weight ratio of epoxide to polyester for a 1:1 "mole" ratio is 172/162.34 or 51.4/48.6.

The catalyst concentration in the reaction mixture should generally be within the range of :rom about 0.00015 to about 0.0300 mmoles per gram of the neat (epoxide and ester) reactants: the preferred range is from about 0.00060 to about 0.0150 mmoles/g.

The effects of both catalyst concentration and catalyst composition on reaction rate are demonstrated subsequently herein.

Generally, the use of a catalyst (of either of Formulas 9 and 10) in which $X^\ominus$ is an anion of an acid with a lower pKa will result in higher Secant Onset Temperatures. The catalysts employed in the present invention show activity (Secant Onset Temperatures) above 125° C., often above about 150° C., and the catalyst activity is well developed below the decomposition temperature of the epoxy/ester composition, preferably below about 320° C., more preferably below about 300° C.

Suitable Solvents for use in the practice of the present invention are inert solvents in general which are capable of forming a homogeneous dispersion or true solution when mixed with the epoxide and ester reactants and/or the less than fully cured reaction product, at temperatures below the Secant Onset Temperature. However, it will generally be desirable to employ solvents which are high boiling enough not to develop autogeneous pressures in excess of several atmospheres.

Illustrative of the types of solvents which are suitable are chlorinated hydrocarbons ($CH_2Cl_2$, for example), aromatics (toluene, for example), ketones (methyl ethyl ketone, for example) and ethers (dioxane, diphenyl ether, for example).

Exemplary Catalyst Preparations & Evaluations

I. Phosphonium catalysts (Formula 9).

IA—Preparation of Tetrabutylphosphonium Chloroacetate By In-Situ Method

Tetrabutylphosphonium bromide, about 16.95 g (0.05 mole), is dissolved in about 15.24 g anhydrous methanol. An aliquot of this solution, about 6.44 g (0.01 mole), is placed in a flask. Chloracetic acid, about 0.945 g (0.01 mole), in about 4.0 g methanol is added to the flask. A solution containing potassium hydroxide, 89.0 weight percent, about 7.58 g in about 18.375 g methanol, is prepared. An aliquot of the potassium hydroxide solution, about 2.15 g (0.01 mole), is added to the flask. A white precipitate is formed. Toluene, about 10.0 g, is added to the mixture. The mixture is vacuum filtered through a glass frit. The filtrate is vacuum stripped at about 50° C. to yield about 3.57 g of white solid. The product is titrated with perchloric acid in glacial acetic acid. The purity of the product is about 66.1 weight percent with the impurity being residual methanol. The yield is about 67 percent of theory for the title compound.

IB—Preparation of Tetrabutylphosphonium o-Chlorobenzoate By In Situ Method

The method of Preparation IA is followed using about 0.437 g (0.01 mole) o-chlorobenzoic acid. The crystalline solid, about 1.09 g, has a purity of about 84.7 weight percent. The yield of title product is about 78 percent of the theoretical yield.

IC—Preparation of Butyltriphenylphosphonium Chloroacetate By In Situ Method

A solution is prepared containing about 18.40 g (0.046 mole) butyltriphenylphosphonium bromide in about 20.07 g anhydrous methanol. An aliquot of the solution, about 8.34 g (0.01 mole), is placed in a flask. As in Example 1, chloroacetic acid solution, followed by potassium hydroxide solution, is added to the flask. Following the work-up of Example 1, about 4.47 g of white solid is obtained with a purity of about 65.7 weight percent. Yield is about 70 percent.

ID—Preparation of Butyltriphenylphosphonium o-Chlorobenzoate By In Situ Method

The method of Preparation IC is followed using about 0.437 g o-chlorobenzoic acid. The product is an oil, about 2.72 g, with a purity of about 69.3 weight percent. The yield of the title product is about 80 percent of theory.

IE—Preparation of Tetrabutylphosphonium p-Toluenesulfonate By Hydroxide Method

Potassium hydroxide, about 89.0 weight percent, about 7.66 g (0.122 mole), is dissolved in about 22.85 g anhydrous methanol. A second solution is prepared by dissolving about 20.32 g (0.06 mole) tetrabutylphosphonium bromide in about 19.21 g anhydrous methanol. The second solution is chilled to about 5° C. About 15.63 g (0.06 mole) of the potassium hydroxide solution is added, keeping the temperature below about 10° C. After stirring for about 1 hour, the chilled solution is vacuum filtered to remove the precipitated potassium bromide. The concentration of tetrabutylphosphonium hydroxide in the remaining solution is determined by titration with perchloric acid in glacial acetic acid to be about 0.993 mmole/g.

A solution is prepared containing about 1.90 g (0.01 mole) p-toluene sulfonic acid in about 3.0 g methanol. This solution is mixed with about 10.07 g (0 01 mole) of the tetrabutylphosphonium hydroxide solution. The precipitate formed is recovered by vacuum stripping at about 50° C. to yield a light brown solid, about 4.56 g, of about 90 weight percent purity.

IF—Preparation of Tetrabutylphosphonium Benzene Sulfinate By Hydroxide Method

The method of Preparation IE is followed. A solution is prepared containing about 2.44 g (0.01 mole) benzene sulfinic acid in about 3.0 g methanol. The solution is mixed with about 10.07 g (0.01 mole) tetrabutylphosphonium hydroxide solution. After the work-up described in Preparation IE, about 4.19 g of the crude title product is obtained as a dark brown solid.

IG—Preparation of Tetrabutylphosphonium p-Toluenesulfimidate By Hydroxide Method The method of Preparation IE is followed. A solution containing about 3.25 g (0.01 mole) bis(p-tolyl)sulfimide in about 4.0 g 50 weight percent methanol/50 weight percent tetrahydrofuran is mixed with about 10.07 g (0.01 mole) of the tetrabutylphosphonium hydroxide solution. After the work-up described in Preparation IE, about 6.32 g of the title product is obtained as a white solid of purity about 87.7 weight percent. The yield of the title product is about 95.1 percent.

The crude phosphonium catalysts of Preparations IA-G were evaluated in the manner described earlier herein. The results are given in Table I, following.

TABLE I

EVALUATION OF PHOSPHONIUM SALTS AS CATALYSTS

| Preparation | Cation | Anion | Exotherm Secant on-set (°C.) | Peak (°C.) |
|---|---|---|---|---|
| IA | tetrabutyl phosphonium | chloroacetate | 128 | 166 |
| B | tetrabutyl phosphonium | o-chlorobenzoate | 134 | 174 |
| C | butyltriphenyl phosphonium | o-chloroacetate | 126 | 162 |
| D | butyltriphenyl phosphonium | o-chlorobenzoate | 129 | 164 |
| E | tetrabutyl phosphonium | p-toluene slufonate | 161 | 198 |
| F | tetrabutyl phosphonium | benzene sulfinate | 160 | 197 |
| G | tetrabutyl phosphonium | p-toluene sulfimidate | 157 | 186 |

The catalytic activity of the compounds described in Preparations I A-G begins at a temperature of greater than about 125° C., as measured by the secant on-set exotherm temperature. The peak exotherm temperatures indicate that the catalytic activity of the compounds is substantially complete at temperatures below about 200° C.

II. Bis(Phosphoranylidene) Ammonium Catalysts (Formula 10)

IIa—Preparation of Bis(triphenylphosphoranylidene) Ammonium Hexafluorophosphate by Aqueous Anion Exchange Method A first solution is prepared by dissolving about 2.87 g (0.005 mole) bis(triphenylphosphoranylidene) ammonium chloride (BTPPN-Cl) in about 5.00 g anhydrous methanol, to which is added about 46.686 g distilled water. A second solution is prepared by dissolving about 0.326 g (0.002 mole) ammonium hexafluorophosphate in about 5.00 g distilled water.

An aliquot of the BTPPN-Cl solution, about 10.91 g (0.001 mole), is added to the ammonium hexafluorophosphate solution. A white precipitate is formed which is separated by vacuum filtration, washed with water, and dried under vacuum at about 80° C. for about 2 hours. The yield of the product, the title product, is about 5.36 g (80 percent of theory).

Elemental analysis of the product gives actual (vs calculated) results of C:59.62 percent (63.25 percent); H:4.23 percent (4.39 percent): N:1.82 percent (2.05 percent).

IIb—Preparation of Bis(triphenylphosphoranylidene) Ammonium Dihydrogen Phosphate by Aqueous Anion Exchange Method A solution is prepared by dissolving about 2.410 g (0.02 mole) of sodium dihydrogenphosphate in about 15.00 g distilled water. An aliquot of the BTPPN-Cl solution of Preparation IIa, about 10.91 g (0.001 mole), is added to the sodium dihydrogenphosphate solution. After the work-up described in Preparation IIa, the resulting precipitate—about 5.60 g of white solid—is isolated, representing a title product yield of about 91 percent of theory.

Elemental analysis of the solid gives actual (vs calculated) results of C:66.61 percent (68.03 percent): H:5.12 percent (5.04 percent): N:2.14 percent (2.20 percent).

IIc—Preparation of Bis(triphenylphosphoranylidene) Ammonium Hydrogen Sulfate by Aqueous Anion Exchange Method A solution is prepared by dissolving about 0.0240 g (2.0 mmole) of sodium bisulfate in about 5.00 g distilled water. An aliquot of the BTPPN-Cl solution of Preparation IIa, about 10.01 g (1.0 mmole), is added to the sodium bisulfate solution. The mixture is placed in a refrigerator at about 5° C where crystals form and are collected by vacuum filtration. Following the work-up of Preparation IIa, about 3.42 g of a white powder are obtained, representing a title product yield of about 55 percent of theory.

IId—Preparation of Bis(triphenylphosphoranylidene) Ammonium Trifluoroacetate by Aqueous Anion Exchange Method A solution is prepared by dissolving about 2.05 g (15.0 mmole) sodium trifluoroacetate in about 10.0 g methanol. A solution of BTPPN-Cl, about 5.735 g (10.0 mmole), dissolved in about 6.0 g methanol is added to the sodium trifluoroacetate solution, followed by the addition of about 400 ml of water. A precipitate is formed which is separated by vacuum filtration. About 5.65 g of white powder is obtained, representing a title product yield of about 87 percent of theory.

IIe—Preparation of Bis(triphenylphosphoranylidene) Ammonium Dihydrogenphosphate by Hydroxide Method BTPPN-Cl, about 3.6174 g (6.3 mmole), is dissolved in about 5.12 anhydrous methanol and chilled to below about 10° C in an ice bath. A second solution, prepared by dissolving about 0.3963 g (6.3 mmole) of 89.0 weight percent potassium hydroxide in about 1.5490 g anhydrous methanol, is added dropwise with agitation to the BTPPN-Cl solution, maintaining the temperature below about 10° C. The mixture becomes a slurry which is vacuum filtered. The precipitate is washed with about 2.00 g methanol and the filtrate and washing combined. This solution is titrated with perchloric acid in glacial acetic acid at about 0.5667 mmole/g hydroxide. The precipitate is dried to give about 0.4241 g powder, about 91 percent yield, as KCl.

To an aliquot of the BTPPN-OH solution, about 3.593 g (2.0 mmole), is added a solution of about 0.2386 g (2.0 mmole) of phosphoric acid in about 4.0 g anhydrous methanol. The solution is filtered at about 0.2 microns, vacuum stripped at about 50° C. to yield about 1.3405 g of a white powder of purity about 89.5 weight percent, representing a title product yield of about 94 percent of theory.

IIf—Preparation of Bis(triphenylphosphoranylidene) Ammonium p-Toluenesulfimidate by Hydroxide Method The method of Preparation IIa is used. To an aliquot of BTPPN-OH solution, about 3.593 g (0.002 mole), is added a solution of about 0.650 g (0.002 mole) p-toluenesulfimidate in about 8.0 g tetrahydrofuran. The reaction mixture is vacuum stripped at about 50° C. to yield a white solid of about 1.6241 g, a title product yield of about 94 percent of theory: purity by titration is about 95.1 weight percent.

IIg—Preparation of Bis(triphenylphosphoranylidene) Ammonium Methane Sulfonate by Anion Exchange Method A 125 ml flask is charged with about 30.07 g anhydrous methanol, followed by about 2.88 g (0.03 mole) methane sulfonic acid. Aqueous ammonium hydroxide, about 29.3 weight percent ammonia, about 1.741 g (0.03 mole), is added dropwise.

To a vial is added about 0.5735 g (1.0 mmole) BTPPN-Cl and about 5.0 g anhydrous methanol. About 1.155 g (3.0 mmole) of the ammonium methane sulfonate solution is added to the BTPPN-Cl solution. The solvent is stripped off under vacuum at about 100° C. The solid residue is extracted with about 15 ml methylene chloride and vacuum filtered through a fine glass frit. The remainder on the frit is washed with an additional about 10 ml methylene chloride, filtered, the filtrates combined and placed in a crystallizing dish on a warm hot plate. Following the evaporation of solvent, the crystalline solid is placed in a vacuum oven held at about 80° C. for about 1 hour to remove traces of solvent. The product is about 0.6087 g of a white crystalline powder, representing a title compound yield of about 96 percent of theory.

Elemental analysis of the powder gives actual (vs calculated) results of C:68.76 percent (70.70 percent); H:5.29 percent (5.74 percent): N:2.27 percent (2.11 percent).

IIh—Preparation of Bis(triphenylphosphoranylidene) Ammonium p-Toluene Sulfonate by Anion Exchange Method The method of Preparation IIg is followed using a solution of about 1.0 mmole BTPPN-Cl in about 3.0 g methanol which is mixed with a solution of about 3.0 mmole sodium p-toluene sulfonate in about 10.0 g methanol. The product is about 0.5749 g white crystalline powder, representing an about 81 percent yield of the tile compound.

Elemental analysis of the product gives actual (vs calculated) results of C:72.69 percent (72.78 percent): H:5.33 percent (5.22 percent): N:1.91 percent (1.97 percent).

IIi—Preparation of Bis(triphenylphosphoranylidene) Ammonium Benzene Sulfonate by Anion Exchange Method The method of Preparation IIg is used on a 1.0 mmole scale starting from BTPPN-Cl and sodium benzene sulfonate for an about 91 percent yield of the title compound as a crystalline product.

Elemental analysis of the product gives actual (vs calculated) results of C:70.80 percent (72.52 percent): H:5.29 percent (5.04 percent); N:2.01 percent (2.01 percent).

IIj—Preparation of Bis(triphenylphosphoranylidene) Ammonium Chlorobenzene Sulfonate by Anion Exchange Method The method of Preparation IIg is used on a 1.0 mmole scale starting from BTPPN-Cl and sodium chlorobenzene sulfonate. An about 93 percent yield of the title product is obtained as a crystalline solid.

Elemental analysis of the product gives actual (vs calculated) results of C:69.34 percent (68.81 percent): H:4.75 percent (5.05 percent): N:1.95 percent (1.91 percent).

IIk—Preparation of Bis(triphenylphosphoranylidene) Ammonium Trifluoromethane Sulfonate by Anion Exchange Method A solution containing BTPPN-Cl, about 1.0 mmole, and lithium trifluoromethane sulfonate, about 3.0 mmoles, in about 3.0 g methanol is added dropwise to about 100 ml stirred water.

A precipitate is formed which is collected by filtration and dried under vacuum for a yield of about 93 percent of the title compound as a white powder.

Elemental analysis of the powder gives actual (vs calculated) results of C:70.09 percent (66.76 percent): H:4.58 percent (4.39 percent); N:2.22 percent (2.05 percent).

The final products of Preparations IIa–d and IIf–k were evaluated by the procedure described earlier herein. The results are given in Table II, following.

TABLE II

EVALUATION OF BIS(TRIPHENYLPHOSPHORANYLIDENE) AMMONIUM SALTS AS CATALYSTS

| Preparation | Anion | Exotherm Secant on-set (°C.) | Peak (°C.) |
|---|---|---|---|
| IIa | hexafluorophosphate $PF_6^\ominus$ | 193 | 236 |
| b | dihydrogen phosphate $H_2PO_4^\ominus$ | 150 | 172 |
| c | hydrogen sulfate $HSO_4^\ominus$ | 133 | 167 |
| d | trifluoroacetate $CF_3CO_3^\ominus$ | 156 | 168 |
| f | p-toluenesulfimidate $(CH_3C_6H_4SO_2)_2N^\ominus$ | 143 | 166 |
| g | methane sulfonate $CH_3SO_3^\ominus$ | 150 | 180 |
| h | p-toluene sulfonate $CH_3PhSO_3^\ominus$ | 166 | 195 |
| i | benzene sulfonate $C_6H_5SO_3^\ominus$ | 163 | 199 |
| j | Chlorobenzene sulfonate $C_6H_4ClSO_3^\ominus$ | 174 | 217 |
| k | trifluoromethane sulfonate $CF_3SO_3^\ominus$ | 203 | 249 |

It will be seen that the secant-onset and peak temperatures for the catalysts of Table II were generally higher than those for the catalysts of Table I, but the peak temperatures were still well below 300° C.

EXAMPLES OF THE INVENTION

The following examples are for purposes of illustration and are not to be taken as limiting the subject invention is a manner inconsistent with the claims in this patent.

EXAMPLE 1

Preparations of Coatings by Solution Casting, Drying and Curing Films; Using Different Types of Epoxides and Catalysts a. From bisphenol A polycarbonate and DGEBA.

(1) Using a catalyst of Formula 9.

A solution is prepared by dissolving bisphenol A polycarbonate (wt. av. mol. wt. about 24,000), about 4.25 g (3.94 mmole/g carbonate linkages, 16.745 mmoles carbonate linkages) and about 5.75 g epoxy resin DER-332 TM (diglycidyl ether of bisphenol A, DGEBA) (5.75 mmole/g epoxy groups (33.0625 mmoles epoxy groups; 1:1 stoichiometry based on two epoxide groups reacting with each carbonate linkage) in about 40.0 g methylene chloride. A second solution is prepared by dissolving tetrabutylphosphonium chloroacetate, about 0.1283 g, in about 1.40 g methylene chloride. To a 10.0 g aliquot of the first solution is added about 200 mg of the second solution, which gives a catalyst concentration of about 0.0157 mmole/g on a solids basis. This combined epoxy resin/polycarbonate/catalyst solution is cast onto a glass plate and the solvent allowed to evaporate over a period of 60 minutes. The resultant film is heated at about 50° C. for about 30 minutes to remove solvent, then cured at about 180° C. for about 2 hours followed by about 200° C. for about 4 hours. The cured film coating is clear, hard, and insoluble in methylene chloride.

(2) Using another catalyst of Formula 9.

A mixture of 57.5 g of DER-332, 42.5 g of the same polycarbonate employed in Example 1a(1) and 0.85 g of a 70 weight percent solution in methanol of tetrabutylphosphonium acetate-acetic acid complex are dissolved in 400 g of $CH_2Cl_2$. The resulting 20 weight percent resin solution is cast onto glass, the solvent allowed to evaporate at ambient temperature for 2 hours. The resulting film is a flexible, deformable thermoplastic material (which can be removed by displacement with water) and is thermoset by heating for 1 hour at 150° C. followed by 1 hour at 180° C., in air. The cured film is hard and is insoluble in $CH_2Cl_2$. It is found to have a Tg greater than 150° C.

If the polycarbonate, or the epoxide, is omitted and the procedure of the preceding experiment is otherwise repeated, no reaction occurs.

(3) Using a catalyst of Formula 10.

A solution is prepared by dissolving bisphenol A polycarbonate, about 4.25 g (3.94 mmole/g carbonate linkages, 16.745 mmoles carbonate linkages) and about 5.75 g epoxy resin DER-332 TM (5.75 mmole/g epoxy groups, total 33.0625 mmoles epoxy groups: 1:1 stoichiometry based on two epoxide groups reacting with each carbonate linkage) in about 40.0 g methylene chloride. A second solution is prepared by dissolving bis (triphenylphosphoranylidene) ammonium benzenesulfonate, PNP-BS, about 0.0307 g, in about 0.25 g methylene chloride. To a 10.0 g aliquot of the first solution is added about 200 mg of the second solution, which gives a PNP-BS catalyst concentration of about 0.0157 mmole/g on a solids basis. This combined epoxy resin/ polycarbonate/catalyst solution is cast onto a glass plate and the solvent allowed to evaporate over a period of 60 minutes. The resultant film is heated at about 50° C. for about 30 minutes to remove solvent, then cured at about 180° C. for about 2 hours followed by about 200° C. for about 4 hours. The cured film coating is clear, hard, and insoluble in methylene chloride.

b. From a copolyester carbonate and a tris(-glycidyloxy phenyl)methane-based novolac.

(1) Using a catalyst of Formula 9.

A solution is prepared by dissolving an aromatic copolyestercarbonate (prepared from bisphenol A, phosgene, and tere- and iso-phthaloyl chlorides) in which the mole ratio of ester to carbonate linkages is 3/1 and the ratio of terephthaloyl to isophthaloyl residues is 4/1) and which has an epoxy reactive equivalent weight of 81.13 based on one epoxy group reacting with each ester linkage and two epoxy groups reacting with each carbonate linkage, about 4.92 g: and about 5.08 g of epoxy resin Tactix* 742 (polyglycidyl ether of a tris (hydroxyphenyl)methane-based polyphenolic novolac resin), having an epoxide equivalent weight (EEW) of 160 (6.25 mmole/g epoxy groups, 1:1 stoichiometry based on two epoxide groups reacting with each carbonate linkage and one with each ester) in about 40.0 g methylene chloride. A second solution is prepared by dissolving tetrabutylphosphonium o-chlorobenzoate, about 0.1194 g, in about 1.43 g methylene chloride containing 5 drops methanol. To a 10.0 g aliquot of the first solution is added about 200 mg of the second solution, which gives a catalyst concentration of about 0.0157 mmole/g on a solids basis. This combined epoxy resin/-polyestercarbonate/catalyst solution is cast onto a glass plate and the solvent allowed to evaporate over a period of 60 minutes. The resultant film is heated at about 50° C. for about 30 minutes to remove solvent, then cured at about 180° C. for about 2 hours followed by about 200° C. for about 4 hours. The cured film coating is clear, hard, and insoluble in methylene chloride.

*Trademark of The Dow Chemical Company.

Note:

The epoxy (Tactix-742) employed in Example 1b. is of Formula 4, given earlier herein, the average value of n" being about 0.2, A' being $CH_2$ and each of $R^4$, $R^5$ and $R^7$ being H. The corresponding epoxides of Formula 4 for which n" is zero are pure tri(glycidyloxyphenyl) methanes which are substantially more expensive than Tactix-742, a product finding a wider market. The latter product includes alcoholic hydroxyls, which are active hydrogen source groups. However, the average number of alcoholic hydroxyls per molecule is only about 0.2—a figure representative of what is meant by "incidental" contents of active hydrogen functions.

(2) Using a catalyst of Formula 10.

A solution is prepared by dissolving an aromatic copolyestercarbonate (prepared from bisphenol A, phosgene, and tere- and isophthaloyl chlorides) in which the mole ratio of ester to carbonate linkages is 3/1 and the ratio of terephthaloyl to isophthaloyl residues is 4/1) and which has an epoxy reactive equivalent weight of 81.13 based on one epoxy group reacting with each ester linkage and two epoxy groups reacting with each carbonate linkage, about 4.92 g, and about 5.08 g of epoxy resin Tactix-742 (polyglycidyl ether of a tris (hydroxyphenyl)methane-based polyphenolic novolac resin), having an epoxide equivalent weight (EEW) of 160 (6.25 mmole/g epoxy groups, 1:1 stoichiometry based on two epoxide groups reacting with each carbonate linkage and one with each ester) in about 40.0 g methylene chloride. A second solution is prepared by dissolving bis(triphenylphosphoranylidene) ammonium benzenesulfonate. PNP-BS, about 0.0307 g, in about 0.25 g methylene chloride. To a 10.0 g aliquot of the first solution is added about 200 mg of the second solution, which gives a PNP-BS initiator concentration of about 0.0157 mmole/g on a solids basis. This combined epoxy resin/polyestercarbonate/initiator solution is cast onto a glass plate and the solvent allowed to evaporate over a period of 60 minutes. The resultant film is heated at about 50° C. for about 30 minutes to remove solvent, then cured at about 180° C. for about 2 hours followed by about 200° C. for about 4 hours. The cured film coating is clear, hard, and insoluble in methylene chloride.

employed in this example is identified in the Notes following the table.

TABLE 1

Tg's OF CURED POLYESTER/POLYEPOXIDE/CATALYST COMPOSITIONS

| EPOXY POLYESTER | DER*-383[1] | DER*-332[2] | TACTIX*-742[3] | TRIS[4] | XD-71756.00[5] | XD-71756.01[6] | DEN*-438[7] |
|---|---|---|---|---|---|---|---|
| DGEBA-PC[2] | | | | | | | |
| Epoxy/PC wt. ratio | 57/43 | 57/43 | 55/45 | 55/45 | 67/33 | 65/35 | 58/42 |
| Tg | 170–175** | 175 | 183 | >183** | 197 | 180 | 188 |
| AEC-405[9] | | | | | | | |
| Epoxy/AEC wt. ratio | 52/48 | 52/48 | 51/49 | 51/49 | 62/38 | 59/41 | 51/49 |
| Tg | 140–143** | 143 | 184 | >184** | 194 | 179 | — |

Notes
(m, m′, n, n′, n″, and n‴ have the conventional meanings, i.e., are average values.)
1. "Crude" (undistilled) DGEBA, Formula 2; n″ about 0.15. $R^4$ = H. $R^5$ = H. Y = H. A = isopropylidene.
2. Distilled DGEBA. Formula 2; n′ = 0. $R^4$ = H. $R^5$ = H. Y = H. A = isopropylidene.
3. Formula 4. n″ about 0.2. $R^4$ = H. $R^5$ = H. $R^7$ = H and Y = H.
4. Leucarin tris-epoxide: tri(p-glycidyloxyphenyl)methane. Formula 4, n″ = 0. Y = H. $R^4$ = H. $R^5$ = H. $R^7$ = H.
5. Formula 3. A phenol-polycyclopentadiene novolac; av. oxirane functionality 3.2. m = 1.2. $R^4$ = H. $R^5$ = H. A′ = dicyclopentadienylidinyl.
6. Formula 3. A phenol-polycyclopentadiene novolac; av. oxirane functionality 2.2. m = 0.2. $R^4$ = H. $R^5$ = H. A′ = dicyclopentadienylidinyl.
7. Formula 3. A phenol-formaldehyde novolac. Oxirane functionality about 4. m = 2. $R^4$ = H. $R^5$ = H. A′ = $CH_2$
8. Bisphenol-A polycarbonate containing 3.94 mmoles of —O—CO—O— per gram of resin.
9. Aromatic copolyestercarbonate prepared from bisphenol-A, phosgene and a 1:4 mixture of iso- and terephthaloyl chlorides; ester to carbonate ratio 3:1.

EXAMPLE 2

Effect of Epoxide and Ester Types on Tg's (Glass Transition Temperatures) of Cured Ester/Oxirane Reaction Products One polycarbonate, one copolyestercarbonate and seven different epoxides are used together with A-1 catalyst to prepare fourteen different but comparable compositions of the invention. The Tg's of cured specimens of thirteen of the compositions are determined as follows.

A 20 weight percent solution of A-2 catalyst (ethyl Triphenyl phosphonium acetate.HOAc) and stoichiometric amounts (1:1) of the polyester and the epoxy resin in $CH_2Cl_2$ is prepared. A film is cast from the solution and dried in the manner of Example 1 herein and is then cured at 150° C. for 30 minutes, followed by 60 minutes at 180° C. The Tg of a test specimen of the cured film is measured by Differential Scanning Calorimetry, at a scan rate of 10° C. per minute, by essentially the procedure described earlier herein.

The amount of catalyst in each of the twelve test solutions is 0.5 percent by weight on a solids basis. The ester to epoxide weight ratio for each composition (solution thereof) is given in the following Table 1. Of the several epoxide type Formulas (1–5) given earlier herein, the one representation of each of the epoxies Again, alcoholic hydroxyl contents corresponding to average n′ and n″ values of 0.15–0.2 in the epoxides of Formulas 2 and 4 are representative of what is meant by reference to "incidental" contents of active hydrogen source groups.

EXAMPLE 3

Effect of Polycarbonate to Epoxy Weight Ratio on Tg of Cured Polycarbonate/DER-332 ™ Mixtures Cured films of mixtures in different weight ratios of DER-332 ™ and the same polycarbonate employed in Example 1a(1) with A-2 catalyst (0.015 mmoles/g solids) are prepared as in that example—except that precure-drying is for 1 hour at 150° C.—and the Tg's of samples of the films are determined. The Tg's and the PC to epoxy weight ratios (and the corresponding oxirane to "ester" (carbonate) group ratios) are given in the following Table 2.

TABLE 2

| Wt. Ratio 332/PC | Tg °C.[2] | Ratio of Oxirane to Carbonate Groups |
|---|---|---|
| 25:75 | 136 | 0.146/0.295 = 0.50/1[1] |
| 50:50 | 154 | 0.291/0.197 = 1.48/1 |
| 55:45 | 166 | 0.321/0.177 = 1.81/1 |
| 57.5:42.5 | 162 | 0.336/0.167 = 2/1 |
| 65:35 | 139 | 0.379/0.138 = 2.75/1 |

[1](25/171.6)/(75/254) = 0.146/0.295
EEW epoxide = 171.6
Mol. wt. polycarbonate unit = 254
[2]Contrast to the Tg of 123 reported by Yu and Bell, Loc cit

EXAMPLE 4

Effect of Polyester Type on Percent Oxirane Conversion

Mixtures of each of four different polyesters with DER-332 ™ and a catalyst are heated as shown in the following Table 3 and the degrees of oxirane conversion determined.

TABLE 3

COMPARISON OF EPOXIDE CONVERSIONS ACHIEVED WITH DIFFERENT POLYESTERS

Mixtures at 1:1 Stoichiometry { Two oxiranes per carbonate group
One oxirane per carboxylate group Epoxide assay by FTIR Ratio $A_{915}/A_{1608}$

| | CATALYST COMPOUND | CATALYST LEVEL mmole/g | REACTION TEMP/TIME | PERCENT OXIRANE CONVERSION |
|---|---|---|---|---|
| POLYESTER | | | | |
| BIS-A-PC[1] | A-2 | 0.0157 | 150° C./30 min | 94 |
| TBBA-PC[2] | A-2 | 0.0157 | 150° C./30 min | 49 |
| TMBA-PC[3] | A-2 | 0.0157 | 150° C./30 min | 51 |
| AEC-405[4] | A-2 | 0.0157 | 150° C./30 min | 87 |
| TBBA-PC[2] | A-2 | 0.0157 | 180° C./30 min | 75 |
| TBBA-PC[2] | PNP-PF$_6$[6] | 0.0150 | 235° C./30 min | 43 |
| CONTROLS | | | | |
| DER-332[5] | A-2 | 0.0157 | 150° C./30 min | 3 |
| BIS A-PC[1] | — | — | 150° C./30 min | 2 |

Notes:
[1] Bisphenol-A Polycarbonate
[2] TetraBromo Bisphenol-A Polycarbonate
[3] Tetra Methyl Bisphenol-A Polycarbonate
[4] Bisphenol-A Polyester Carbonate-405
[5] Dow Epoxy Resin-332 ®
[6] Bis(triphenylphosphoranylidene)Ammonium Hexafluorophosphate

EXAMPLE 5

Effect of Cure Schedule on Tg

Essentially in the manner of Example 1a(1). aliquots of a 57.5/42.5 wt. ratio mixture of DER-332 TM with the same polycarbonate are subjected to three different cure schedules. The catalyst, A-2, is used at a level of 0.0157 mmoles/g. The Secant Onset Temperature of the reactive mixture is 140° C., with a peak temperature of 177° C. The Tg's of the cured samples are determined and are given in the following Table 4.

TABLE 4

| Minutes at 150° C. | Minutes at 180° C. | Tg °C. |
|---|---|---|
| 30 | — | 175 |
| 60 | — | 168 |
| 60 | 60 | 175 |

EXAMPLE 6

Water Absorption

A 57.5/42.5 wt. ratio DER-332 TM BIS A-PC mixture with 0.0015 mmoles/g of a catalyst of Formula 15, PNP-BS (Bis(triphenylphosphoranylidene)Ammonium Benzene Sulfonate) is used to prepare a 0.25 mm thick film, in essentially the manner of Example 1a(1). The cure schedule is 30 minutes at 150° C. and 90 minutes at 180° C. After 16 hours immersion in water, a sample of the cured film is found to have a water pick-up of 0.8 weight percent. For comparison, an otherwise comparable cured film is prepared from DER-332 TM and 18.3 PHR (parts per hundred parts of resin) of a eutectic blend of aromatic amines sold by Anchor Chemicals, as Ancamine-1482 (Registered), a representative "state of the art" curing agent for polyhydroxy polyester epoxides. After 16 hours immersion in water, the latter film has taken up 1.6 weight percent water.

MELT BLENDING STUDIES

EXAMPLE 7

Effect of Catalyst Concentration on Reaction Rate at Secant Onset Temperature

The following DSC Data (Table 5) was obtained on the "standard" uncured 57.5/42.5 weight percent mixture of DER-332 TM and the bis A polycarbonate, prepared as in Example 1a(1) except that the catalyst was PNP-BS.

TABLE 5

| PNP-BS Concentration mmole/g | Secant Onset C | Ave log $K_{app}$ |
|---|---|---|
| 0.00075 | 191.0 | −1.41 |
| 0.0015 | 183.1 | −1.48 |
| 0.003 | 176.0 | −1.61 |
| 0.006 | 170.3 | −1.52 |
| 0.0157 | 163.8 | −1.50 |

These results are consistent with the reflection of the same absolute reaction rate at the secant onset temperatures for different catalyst concentration.

EXAMPLE 8

Compatibility Study

2:1 Oxirane/carbonate mixtures 1 of each of DER-332* and DEN-438* with the "standard" BIS-A polycarbonate were prepared as resin impregnated powders by adding the polycarbonate as a dry powder to a liquid pre-mix of the epoxy and the catalyst (PNP-ClBS; bis(-triphenylphosphoranylidene) ammonium chlorobenzene sulfonate) and stirring in a stainless steel bowl with a Hobard paddle mixer until (ca. 10 min) a uniform material resembling wet sand formed.
*Trademark of The Dow Chemical Company.

The minimum temperature required to achieve a homogeneous melt in a residence time of 70–100 seconds at a shear rate of 150 sec-1 in a single screw extruder was found to be 175° C. for the DER-332 TM -based material and 210° C. for the DEN-438 TM -based material.

When cooled rapidly, both extrudates were clear solids. When cooled slowly, each extrudate was a homogeneous, two phase dispersion.

The DER-332-based extrudates sintered on standing but the DEN-438-based extrudates did not.

Note:
1. 57.5/42.5 and 58/42 wt. ratio respectively.

EXAMPLE 9

Effect of Catalyst Composition on Gelation Time

Each of three batches of 57.5/42.5 weight percent DER-332 ™/BIS A-PC mixture was made up in the manner of Example 1a(1) with one of two catalysts, as noted in Table 6 following.

Each batch was heated to it's Secant Onset Temperature in a Brabender Plasicorder and then stirred at a shear rate of 150 sec $-1$ as the following exotherm developed. The viscosity of each batch was tracked and found to build gradually, then to dramatically increase as gelation occurred.

TABLE 6

| CATALYST | LEVEL mmole/g | TEMP. °C. | TIME min. |
|---|---|---|---|
| PNP-TFA[1] | 0.006 | 155 | 4.2 |
| PNP-TFA | 0.006 | 145 | 6.8 |
| PNP-BS[2] | 0.0015 | 175 | 20.0 |

[1] bis(triphenylphosphoranylidene)ammonium trifluoroacetate
[2] bis(triphenylphosphoranylidene)ammonium benzene sulfonate Extruder melt blending of the epoxy/PC system requires about 2 minutes. The time "windows" provided by PNP-TFA will be seen to be uncomfortably short. However, a safety factor of about 10 is provided by PNP-BS.

(A-2 catalyst provides too short a window to be practical for melt-blending operations.)

EXAMPLE 10

Melt Blending of Polycarbonate/Epoxy Resin/Catalyst Mixtures (a) Continuous

Epoxy resin DER-332 ™, 1750 g, was placed in a glass single neck flask, followed by bis(triphenylphosphoranylidene)ammonium p-chlorobenzenesulfonate catalyst (PNP-ClBS), 3.4882 g. The charged flask was connected to a Rotavapor apparatus where it was heated at 100° C. under vacuum (a minimum of 29.5 inches water) while slowly revolving. After all bubbling had stopped and the catalyst was completely dissolved (about 30–60 minutes) the charged flask was removed, sealed, and allowed to cool to ambient temperature. Powered bis phenol A polycarbonate was dried by heating under vacuum at 85° C. for 24 hours. A 1647 g portion of the above "catalyzed" DER-332 ™ epoxy resin, was placed in a stainless steel bowl on a Hobart paddle mixer. While stirring, the dried polycarbonate, 1353 g, was added and allowed to mix until (about 10 minutes) a uniform material resembling wet sand was obtained. The concentration of PNP-ClBS was 0.0015 mmole/g.

A ⅜ inch single screw extruder was pre-heated in a manner such that the temperature profile down the barrel was 157° C., 157° C., 100° C., and 100° C. at the die. The polycarbonate/epoxy resin/catalyst mixture prepared above was fed through a water-cooled hopper and melt blended and extruded through a screen pack at a rate such that the residence time of the mixture in the barrel was about 2 minutes. Only about 3 percent of available epoxy groups were reacted during this process. The extrudate was run through a chilled water trough and then sent to a chopper to pelletize the product. Pellets were dried under vacuum at ambient temperature for 24 hours. The pelletized product was compression molded into test specimens and cured, then checked for Tg (ca. 188°, confirmed).

(b) Batch

A 58/42 weight percent DEN-438 ™ and Bis A polycarbonate mixture with PNP-ClBS catalyst (0.0015 mmoles/g) was made up in a Brabender Plasticorder by heating for about 100 seconds at about 200° C., with stirring, and then dumped and quenched. The resulting clear solid was retained, without being pelletized, for later use.

EXAMPLE 11

(a) Comparison with DER-332 ™/Ancamine-1482 as laminate with fiber glass cloth.

Eight-ply laminates were prepared with Burlington plain weave 7 mil, fiber glass cloth (7628, I-617 finish and each of two epoxy resin mixtures. One mixture was the 57.5/42.5 weight percent mixture of DER-332 ™ and Bis A polycarbonate and 0.0015 mmoles/g of PNP-BS catalyst employed in Example 6. The other mixture, used as a control, was DER-332 ™ and 18.3 phr Ancamine1482. Each laminate had a 25 weight percent content of the matrix (glass cloth) and was 1.2 mm thick. Both laminates were cured under atmospheric pressure for 30 minutes at 180° C. followed by 60 minutes at 215° C. under pressure of 50 psig. Physical property test specimens of each laminate were identically prepared and tested, with the results given in Table 7 below.

(b) Closely comparable results were obtained from otherwise identical laminates prepared from the DER-332/Bis A PC/PNP-BS blend of Example 10 (a).

It will be seen that no loss in the measured properties consequent on the copolymerization of the epoxy with the polycarbonate is apparent.

TABLE 7

| MATRIX COMPARISON FOR 8-PLY LAMINATES | | |
|---|---|---|
| Property | System | Control |
| Ultimate tensile (psi) | 45240 | 44204 |
| Std. dev. | 4454 | 1874 |
| Break elongation (percent) | 10.4 | 10.7 |
| Std. dev. | 1.2 | 0.4 |
| Tangent modulus (kpsi) | 581 | 549 |
| Std. dev. | 54.9 | 36.2 |

What is claimed is:

1. The method of making a latently thermosettable, thermoplastic resin mass which includes the following steps:
   A. selecting a composition which comprises
   (a) an aromatic polyester essentially free of active hydrogens,
   (b) a compatible polyepoxide essentially free of active hydrogens, and
   (c) a catalytically effective amount of a catalyst for the reaction of ester groups in said polyester with oxiranes in said polyepoxide;:
   the number ratio of said oxiranes to said ester groups being within the range of from about 0.8/1 to about 2.25/1,
   and said catalyst being a polyorgano, pentavalent phosphorous salt which, when (1) said polyester is a polycarbonate prepared from bisphenol A and phosgene and has a weight average molecular weight of about 24,000,
(2) said polyepoxide is the diglycidylether of bisphenol A,
(3) the polycarbonate to polyepoxide ratio by weight is 42.5/57.5 and the amount of said catalyst is 0.015 mmoles per gram of the total weight of polycarbonate and polyepoxide, and
(4) the polycarbonate, polyepoxide and catalyst are mixed together and the Secant Onset Temperature of the resultant mixture determined, results in said temperature being within the range extending from above 125° C. to the highest temperature at which said composition can be melt-processed without deteriorating or prematurely setting up, and B. converting a body of said composition, by melt-processing it at or above a first temperature, to a shaped mass which is partially cured to an extent such that if it is cooled as necessary until it solidifies and then reheated, it can be further melt-processed at a temperature higher than said first temperature.

2. The method of claim 1 wherein said polyester is a polycarboxylate.

3. The method of claim 1 wherein said polyester comprises both carboxylate and carbonate groups.

4. The method of claim 1 wherein said polyester is a polycarbonate.

5. The method of claim 1 wherein said polyepoxide comprises, per molecule, an average of at least two oxirane groups contained in glycidyl, glycidyloxy or glycidyloxycarbonyl groups attached directly to one or more aromatic rings.

6. The method of claim 1 wherein said phosphorous compound is a salt of the formula

[JQ$_t$] ⊕X⊖ wherein t is zero or one: and
when t is zero, J is $R^4$ and said salt is a tetraorganophosphonium salt, $R_4P$ ⊕X⊖ in which R, independently in each occurrence, is a $C_1$-$C_{20}$ hydrocarbyl radical and X⊖ is an anion selected from the group consisting of
$R^1SO_3\ominus$, $R^2COO\ominus$, $(R^3SO_2)_2N\ominus$, $R^1SO_2\ominus$, $(R^1O)HPO_3\ominus$, $(R^1O)_2PO_2\ominus$, and $(R^1O)HPO_2\ominus$,
in which
$R^1$ is a $C_1$-$C_{12}$ hydrocarbyl or halohydrocarbyl radical,
$R^2$ is a $C_1$-$C_{12}$ hydrocarbyl or halohydrocarbyl radical, and
$R^3$ is a $C_1$-$C_{12}$ hydrocarbyl radical;
when t=1, J is $R_3P$, Q is =N⊕=$PR_3$ and said compound is a hexaorgano phosphine iminium salt, $R_3P$=N⊕=$PR_3$X⊖ in which R, independently in each occurrence, is a $C_1$-$C_{20}$ hydrocarbyl radical and X⊖ is an anion selected from the group consisting of
$R^1SO_3\ominus$, $R^2COO\ominus$, $(R^3SO_2)_2N\ominus$, $R^1SO_2\ominus$, $(R^1O)HPO_3\ominus$, $(R^1O)_2PO_2\ominus$, $(R^1O)HPO_2\ominus$, $H_2PO_4\ominus$, $HCO_3\ominus$, $HSO_4\ominus$, $PF_6\ominus$, and $SbF_6\ominus$,
in which $R^1$, $R^2$ and $R^3$ are as above defined;
the term halohydrocarbyl radical means a hydrocarbyl radical substituted with 1 to 3 bromo, chloro or fluoro radicals
and when X⊖ is $R^2COO\ominus$, said compound may be in the form of a complex with the corresponding free acid.

7. The method of claim 6 wherein said phosphorous compound is said tetraorganophosphonium compound.

8. The method of claim 6 wherein said phosphorous compound is said hexaorgano phosphine iminium salt.

9. The method of claim 3 in which the polyester is a copolyestercarbonate prepared from bisphenol A, phosgene, terephthaloyl chloride and isophthaloyl chloride, the number ratio of carboxylate to carbonate groups is about 3:1 and the number ratio of terephthaloyl to isophthaloyl residues is about 4:1.

10. The method of claim 4 wherein said polycarbonate is a reaction product of a bisphenol and a carbonate precursor, said bisphenol being of the formula

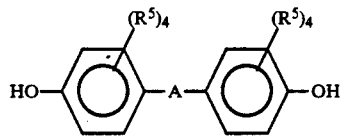

wherein each $R^5$, independently is H or a non-interfering substituent, A is a direct bond, a hydrocarbylene group of 1 to about 12 carbons, —S—, —S—S—, —SO—, —SO$_2$—, —CO—, —O— or —C(CF$_3$)$_2$—; and said polycarbonate has a weight average molecular weight within the range of from about 226 to about 35,000.

11. The method of claim 1 in which said oxirane to ester ratio is within the range of from about 0.9/1 to about 2.1/1.

12. The method of claim 4 in which the number ratio of oxirane to carbonate groups is within the range of from about 1.8/1 to about 2.1/1.

13. The method of claim 5 wherein said polyepoxide consists essentially of one or more species of the following Formulas 1-5:

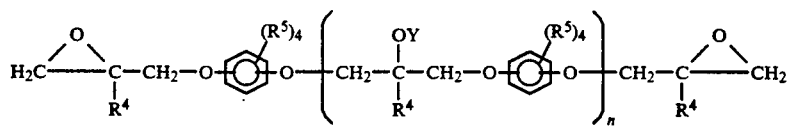

Formula 1

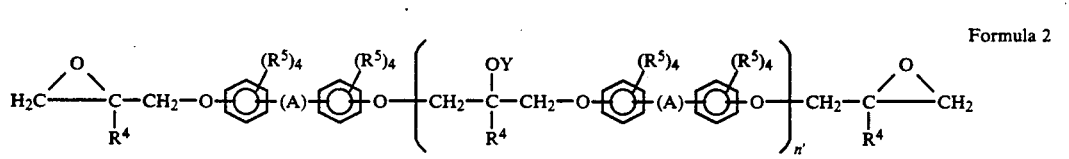

Formula 2

Formula 3

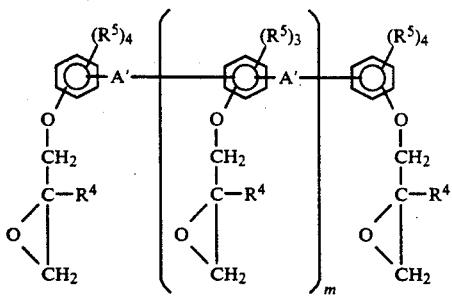

Formula 4

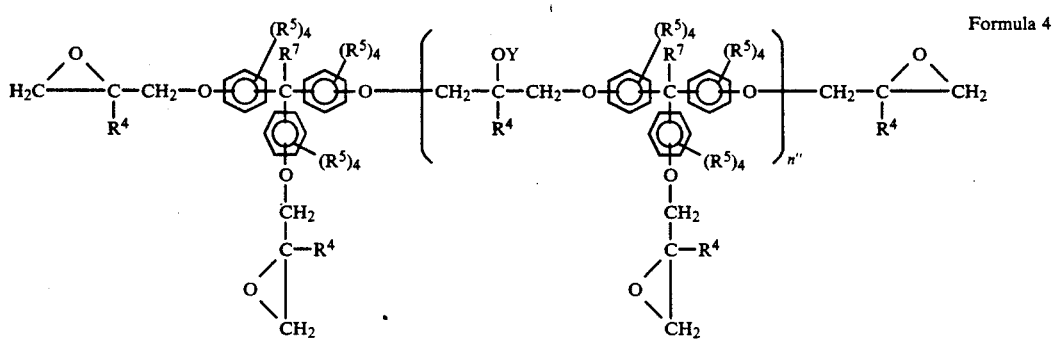

Formula 5

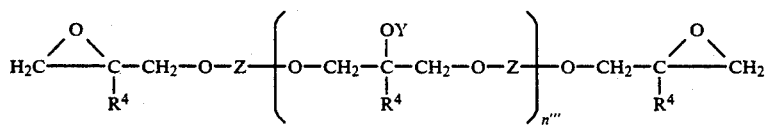

wherein A is a direct bond, a hydrocarbylene group having from 1 to about 12 carbon atoms, $$-S-, -S-S-, -\underset{O}{\overset{O}{\overset{\|}{S}}}-, -\underset{O}{\overset{O}{\overset{\|}{S}}}-, -\overset{O}{\overset{\|}{C}}-, \text{ or } -O-;$$

Z is hydrocarbylene group containing from 1 to about 15 carbon atoms or a $-C(R^6)_2-C(R^6)_2-[O-C(R^6)_2-C(R^6)_2]-m'$ group; A' is a divalent hydrocarbylene group having from 1 to about 3 carbon atoms or a polycyclopentadienylidenyl radical—i.e.

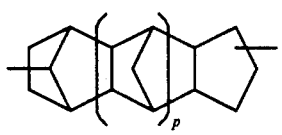

in which p has a value of from zero to about 10; in the forgoing Formulas 1-5, each $R^4$, independently is H or $CH_3$; each $R^5$, independently, is H, a $C_1$-$C_4$ alkyl, alkenyl or alkoxy group, a bromo or chloro radica. Each $R^6$ is independently H or a $C_1$-$C_4$ hydrocarbyl radical: $R^7$ is H or a $C_1$-$C_{10}$ alkyl or alkenyl radical; m has a value of from about 0.001 to about 6; m' has a value of from about 1 to about 100; n has a value of from zero to about 60; n' has a value of from zero to about 40: n" has a value of from zero to about 5; n'" has a value of from zero to about 40; and Y is H, $R^8$, $-CO-R^8$ or $-CO-O-R^8$, $R^8$ being a $C_1$-$C_{15}$ hydrocarbyl radical, with the restriction that the average number of Y's per molecule of said polyepoxide which are H is about 0.2 or less.

14. The method of claim 13 in which said polyepoxide is of Formula 2, wherein n' has a value of about 0.2 or less, A is $C(CH_3)_2$ and each of $R^4$, $R^5$ and Y is H.

15. The method of claim 13 in which said polyepoxide is a phenol-polycyclopentadiene novolac, of Formula 3, having an oxirane functionality of about 3.2: 15 m is about 1.2, A' is dicyclopentadienylidenyl and each $R^4$ and $R^5$ is H.

16. The method of claim 13 in which said polyepoxide is a phenol—formaldehyde novolac of Formula 3, having an oxirane functionality of about 4, m is about 4, A'=$CH_2$ and each of $R^4$ and $R^5$ is H.

17. The method of claim 13 in which said polyepoxide is a of Formula 4, wherein n" is about 0.2 or less and each of $R^4$, $R^5$, $R^7$ and Y is H.

18. The method of claim 10 in which said precursor is phosgene, $R^5$ is H in each occurrence, A is $C(CH_3)_2$ and said polycarbonate contains about 4 mmole of $-O-CO-O-$ group per gram of resin and has a weight average molecular weight of about 24,000.

19. The method of claim 13 wherein said phosphorous compound is a salt of the formula $$[JQ_t] \oplus X \ominus$$

wherein t is zero or one: and when t is zero, J is $R_4$ and said salt is a tetraorganophosphonium salt, $R_4P \oplus X\ominus$ in which R, independently in each occurrence, is a $C_1$-$C_{20}$ hydrocarbyl radical and $X\ominus$ is an anion selected from the group consisting of
$R^1SO_3\ominus$, $R^2COO\ominus$, $(R^3SO_2)_2N\ominus$, $R^1SO_2\ominus$, $(R^{10}O)HPO_3\ominus$, $(R^{10}O)_2PO_2\ominus$, and $(R^{10}O)HPO_2\ominus$, in which $R^1$ is a $C_1$-$C_{12}$ hydrocarbyl or halohydrocarbyl radical, $R^2$ is a $C_1$-$C_{12}$ hydrocarbyl or halohydrocarbyl radical, and $R^3$ is a $C_1$-$C_{12}$ hydrocarbyl radical:

when t=1, J is $R_3P$, Q is $=N\oplus=PR_3$ and said compound is a hexaorgano phosphine iminium salt, $R_3P=N\oplus=PR_3 X\ominus$ in which R, independently in each occurrence, is a $C_1$-$C_{20}$ hydrocarbyl radical and $X\ominus$ is an anion selected from the group consisting of $R^1SO_3\ominus$, $R^2COO\ominus$, $(R^3SO_2)_2N\ominus$, $R^1SO_2\ominus$, $(R^1O)HPO_3\ominus$, $(R^1O)_2PO_2\ominus$, $(R^1O)HPO_2\ominus$, $H_2PO_4\ominus$, $HCO_3\ominus$, $HSO_4\ominus$, $PF_6\ominus$, and $SbF_6\ominus$, in which $R^1$, $R^2$ and $R^3$ are as above defined;

the term halohydrocarbyl radical means a hydrocarbyl radical substituted with 1 to 3 bromo, chloro or fluoro radicals and when $X\ominus$ is $R^2COO\ominus$, said compound may be in the form of a complex with the corresponding free acid.

20. The method of claim 19 wherein said phosphorous compound is said tetraorganophosphonium salt.

21. The method of claim 19 wherein said phosphorous compound is said hexaorgano phosphine iminium salt.

22. The method of claim 20 in which said polyester is a polycarboxylate.

23. The method of claim 20 in which said polyester is a copolyestercarbonate.

24. The method of claim 20 in which said polyester is a polycarbonate.

25. The method of claim 21 in which said polyester is a polycarboxylate.

26. The method of claim 21 in which said polyester is a copolyestercarbonate.

27. The method of claim 21 in which said polyester is a polycarbonate.

28. The method of claim 2 wherein the number ratio of oxirane to carboxylate groups is within the range of from about 0.9/1 to about 1.1/1.

29. The method of claim 10 wherein the number ratio of oxirane to carbonate groups is within the range of from about 1.8/1 to about 2.1/1.

30. The method of claim 24 wherein the number ratio of oxirane to carbonate groups is within the range of from about 1.8/1 to about 2.1/1.

31. The method of claim 1 in which said mass is not cooled and is further heated at or above said first temperature until it is fully cured.

32. The method of claim 31 in which the rate of said further heating is such that said mass remains unmelted throughout that heating.

33. The method of claim 1 in which said mass is not cooled and is reshaped by further melt-processing during said further heating.

34. The method of claim 1 in which said mass is cooled.

35. The method of claim 34 in which the cooled mass is subsequently fully cured by further heating and is not changed in shape.

36. The method of claim 34 in which the cooled mass is comminuted, melted, reshaped by melt-processing, and fully cured by further heating.

37. The cured product of claim 35.

38. The cured product of claim 36.

* * * * *